United States Patent
Eisele et al.

(10) Patent No.: US 9,642,209 B2
(45) Date of Patent: *May 2, 2017

(54) LED LIGHTING SYSTEM

(71) Applicant: DELOS LIVING LLC, New York, NY (US)

(72) Inventors: Eric Jon Eisele, Aston, PA (US); Adam K. Fontecchio, Exton, PA (US); Donald Sheldon, Downingtown, PA (US)

(73) Assignee: DELOS LIVING, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,317

(22) Filed: Jun. 20, 2016

(65) Prior Publication Data

US 2016/0374172 A1    Dec. 22, 2016

Related U.S. Application Data

(63) Continuation of application No. 14/805,243, filed on Jul. 21, 2015, now Pat. No. 9,392,665, which is a (Continued)

(51) Int. Cl.
*H05B 37/02* (2006.01)
*H05B 33/08* (2006.01)

(52) U.S. Cl.
CPC ......... *H05B 33/0869* (2013.01); *H05B 33/08* (2013.01); *H05B 33/083* (2013.01);
(Continued)

(58) Field of Classification Search
CPC ................. H05B 37/00; H05B 37/02
(Continued)

(56) References Cited

U.S. PATENT DOCUMENTS 628,351 A    7/1899   O'Neill
828,733 A    8/1906   Fuller
(Continued)

FOREIGN PATENT DOCUMENTS

CA    2 307 458 A1   11/2001
CA    2 740 939 A1    3/2010
(Continued)

OTHER PUBLICATIONS

Jernigan, R., "Light Studies Focus on Circadian Rhythms," Photonics Showcase, Nov. 2009, p. 12.
(Continued)

*Primary Examiner* — Tung X Le
(74) *Attorney, Agent, or Firm* — Seed IP Law Group LLP

(57) ABSTRACT

A system and method involving lighting fixtures, a control network, a controller and other devices such as light sensors, input devices and network adapters for coordinating precise brightness and color schedules among the lighting fixtures while maintaining a high color reliability including provisions for managing a plurality of lighting fixtures. The lighting fixtures contain lighting elements selected such that when controlled properly, operating along a daytime locus, the resultant light output closely resembles sunlight on a cloudless day in spectral characteristics, and wherein the total flux of blue light can be adjusted from a relative level of 1-100% the maximum blue flux of the lighting fixture by controlling individual lighting elements.

24 Claims, 30 Drawing Sheets

Related U.S. Application Data continuation of application No. 14/486,753, filed on Sep. 15, 2014, now Pat. No. 9,125,257, which is a continuation of application No. 13/863,589, filed on Apr. 16, 2013, now Pat. No. 8,836,243, which is a continuation of application No. 12/900,158, filed on Oct. 7, 2010, now Pat. No. 8,436,556.

(60) Provisional application No. 61/249,858, filed on Oct. 8, 2009.

(52) U.S. Cl.
CPC ..... *H05B 33/0827* (2013.01); *H05B 33/0845* (2013.01); *H05B 33/0851* (2013.01); *H05B 33/0857* (2013.01); *H05B 33/0863* (2013.01); *H05B 37/02* (2013.01); *H05B 37/0218* (2013.01); *H05B 33/086* (2013.01)

(58) Field of Classification Search
USPC ....... 315/149, 152, 158, 291, 294, 297, 307, 315/312
See application file for complete search history.

(56) References Cited

U.S. PATENT DOCUMENTS

| | | | |
|---|---|---|---|
| 853,033 A | 5/1907 | Roberts |
| 1,648,277 A | 11/1927 | Korb |
| 2,184,644 A | 12/1939 | Homberger |
| 3,621,838 A | 11/1971 | Harding et al. |
| 3,678,337 A | 7/1972 | Grauvogel |
| 4,638,853 A | 1/1987 | Papak |
| D295,934 S | 5/1988 | Dyrhood |
| 4,803,625 A | 2/1989 | Fu et al. |
| 4,858,609 A | 8/1989 | Cole |
| 4,882,166 A | 11/1989 | Graham et al. |
| 4,893,291 A | 1/1990 | Bick et al. |
| 4,911,166 A | 3/1990 | Leighton et al. |
| 4,911,737 A | 3/1990 | Yehl et al. |
| 4,930,505 A | 6/1990 | Hatje |
| 4,938,582 A | 7/1990 | Leslie |
| 4,962,687 A | 10/1990 | Belliveau et al. |
| D312,018 S | 11/1990 | Giesy |
| 5,006,985 A | 4/1991 | Ehret et al. |
| 5,010,777 A | 4/1991 | Yehl et al. |
| 5,043,840 A | 8/1991 | Yehl et al. |
| 5,079,682 A | 1/1992 | Roberts |
| 5,092,669 A | 3/1992 | Anderson |
| 5,121,030 A | 6/1992 | Schott |
| 5,176,133 A | 1/1993 | Czeisler et al. |
| 5,193,900 A | 3/1993 | Yano et al. |
| 5,197,941 A | 3/1993 | Whitaker |
| 5,214,736 A | 5/1993 | Uemiya et al. |
| D335,978 S | 6/1993 | Grahn et al. |
| D345,071 S | 3/1994 | Gould |
| 5,292,345 A | 3/1994 | Gerardo |
| 5,304,212 A | 4/1994 | Czeisler et al. |
| 5,350,977 A | 9/1994 | Hamamoto et al. |
| 5,357,170 A | 10/1994 | Luchaco et al. |
| D364,762 S | 12/1995 | Compton et al. |
| D365,484 S | 12/1995 | Trattner, Jr. et al. |
| 5,473,537 A | 12/1995 | Glazer et al. |
| 5,503,637 A | 4/1996 | Kyricos et al. |
| 5,545,192 A | 8/1996 | Czeisler et al. |
| 5,589,741 A | 12/1996 | Terman et al. |
| 5,692,501 A | 12/1997 | Minturn |
| 5,721,471 A | 2/1998 | Begemann et al. |
| D396,581 S | 8/1998 | Schubert |
| 5,791,982 A | 8/1998 | Curry et al. |
| 5,805,267 A | 9/1998 | Goldman |
| D401,085 S | 11/1998 | Grant |
| 5,919,217 A | 7/1999 | Hughes |
| 5,937,387 A | 8/1999 | Summerell et al. |
| 5,963,294 A | 10/1999 | Schiffer |
| 6,053,936 A | 4/2000 | Koyama et al. |
| D424,356 S | 5/2000 | Hahn |
| 6,135,970 A | 10/2000 | Kadhiresan et al. |
| 6,166,496 A | 12/2000 | Lys et al. |
| 6,197,094 B1 | 3/2001 | Thofelt |
| 6,235,046 B1 | 5/2001 | Gerdt |
| 6,238,337 B1 | 5/2001 | Kambhatla et al. |
| 6,269,339 B1 | 7/2001 | Silver |
| 6,331,160 B1 | 12/2001 | Bardy |
| 6,340,868 B1 | 1/2002 | Lys et al. |
| 6,348,867 B1 | 2/2002 | Myllymäki |
| 6,350,275 B1 | 2/2002 | Vreman et al. |
| 6,387,844 B1 | 5/2002 | Fujishima et al. |
| 6,441,558 B1 | 8/2002 | Muthu et al. |
| 6,459,919 B1 | 10/2002 | Lys et al. |
| 6,498,440 B2 | 12/2002 | Stam et al. |
| 6,507,709 B2 | 1/2003 | Hirai et al. |
| 6,535,190 B2 | 3/2003 | Evanicky |
| 6,554,439 B1 * | 4/2003 | Teicher .................. F21S 8/006 315/360 |
| 6,567,009 B2 | 5/2003 | Ohishi et al. |
| D477,158 S | 7/2003 | Calcerano et al. |
| 6,589,912 B2 | 7/2003 | Kawai |
| 6,607,484 B2 | 8/2003 | Suzuki et al. |
| 6,610,127 B2 | 8/2003 | Lu |
| 6,623,512 B1 | 9/2003 | Heller et al. |
| 6,661,798 B2 | 12/2003 | Sano et al. |
| 6,683,419 B2 | 1/2004 | Kriparos |
| 6,720,745 B2 | 4/2004 | Lys et al. |
| 6,727,091 B2 | 4/2004 | Darlington |
| 6,738,551 B2 | 5/2004 | Noda et al. |
| 6,755,783 B2 | 6/2004 | Cosentino et al. |
| 6,772,016 B1 | 8/2004 | Örn |
| 6,782,351 B2 | 8/2004 | Reichel et al. |
| 6,806,659 B1 | 10/2004 | Mueller et al. |
| 6,878,191 B2 | 4/2005 | Escaffre et al. |
| 6,879,451 B1 | 4/2005 | Hewlett et al. |
| 6,888,779 B2 | 5/2005 | Mollicone et al. |
| 6,992,803 B2 | 1/2006 | Chang |
| 7,014,336 B1 | 3/2006 | Ducharme et al. |
| 7,038,399 B2 | 5/2006 | Lys et al. |
| 7,065,280 B2 | 6/2006 | Ogawa et al. |
| 7,067,995 B2 | 6/2006 | Gunter et al. |
| D526,512 S | 8/2006 | Hahn |
| 7,092,101 B2 | 8/2006 | Brady et al. |
| D530,940 S | 10/2006 | Raile |
| 7,145,295 B1 | 12/2006 | Lee et al. |
| 7,145,614 B2 | 12/2006 | Lee et al. |
| 7,173,384 B2 | 2/2007 | Plötz et al. |
| 7,213,940 B1 | 5/2007 | Van De Ven et al. |
| 7,215,086 B2 | 5/2007 | Maxik |
| 7,224,282 B2 | 5/2007 | Terauchi et al. |
| 7,256,554 B2 | 8/2007 | Lys |
| 7,274,160 B2 | 9/2007 | Mueller et al. |
| 7,288,902 B1 | 10/2007 | Melanson |
| 7,302,313 B2 | 11/2007 | Sharp et al. |
| 7,308,296 B2 | 12/2007 | Lys et al. |
| 7,319,298 B2 | 1/2008 | Jungwirth et al. |
| 7,324,874 B2 | 1/2008 | Jung |
| 7,327,337 B2 | 2/2008 | Callahan |
| 7,348,949 B2 | 3/2008 | Lee et al. |
| D566,428 S | 4/2008 | Kester |
| 7,354,172 B2 | 4/2008 | Chemel et al. |
| 7,358,679 B2 | 4/2008 | Lys et al. |
| 7,364,583 B2 | 4/2008 | Rose |
| 7,387,405 B2 | 6/2008 | Ducharme et al. |
| 7,446,303 B2 | 11/2008 | Maniam et al. |
| 7,453,217 B2 | 11/2008 | Lys et al. |
| 7,520,634 B2 | 4/2009 | Ducharme et al. |
| 7,545,267 B2 | 6/2009 | Stortoni |
| 7,553,039 B2 | 6/2009 | Harris et al. |
| 7,557,521 B2 | 7/2009 | Lys |
| 7,572,028 B2 | 8/2009 | Mueller et al. |
| 7,573,210 B2 | 8/2009 | Ashdown et al. |
| 7,647,285 B2 | 1/2010 | Heckerman et al. |
| 7,659,673 B2 | 2/2010 | Lys |
| 7,679,281 B2 | 3/2010 | Kim et al. |
| 7,689,437 B1 | 3/2010 | Teller et al. |
| 7,759,854 B2 | 7/2010 | Miller et al. |

(56) References Cited

U.S. PATENT DOCUMENTS

| | | |
|---|---|---|
| 7,772,965 B2 | 8/2010 | Farhan et al. |
| 7,827,039 B2 | 11/2010 | Butcher et al. |
| 7,828,205 B2 | 11/2010 | Cronin et al. |
| 7,848,945 B2 | 12/2010 | Rozell et al. |
| D632,102 S | 2/2011 | Sato |
| D634,952 S | 3/2011 | Gile |
| 7,901,071 B1 | 3/2011 | Kulas |
| 7,967,731 B2 | 6/2011 | Kil |
| 7,973,759 B2 | 7/2011 | Huang et al. |
| 7,977,904 B2 | 7/2011 | Berman et al. |
| 8,028,706 B2 | 10/2011 | Skene et al. |
| 8,038,615 B2 | 10/2011 | Gobeyn et al. |
| 8,064,295 B2 | 11/2011 | Palmer |
| 8,100,552 B2 | 1/2012 | Spero |
| 8,143,792 B2 | 3/2012 | Joo et al. |
| 8,159,150 B2 | 4/2012 | Ashdown et al. |
| 8,188,873 B2 | 5/2012 | Barth et al. |
| D666,123 S | 8/2012 | Sichello |
| 8,253,349 B2 * | 8/2012 | Shteynberg ........ H05B 33/0818 315/149 |
| 8,321,192 B2 | 11/2012 | Boyce et al. |
| 8,352,408 B2 | 1/2013 | Guillama et al. |
| 8,358,214 B2 | 1/2013 | Amigo et al. |
| 8,359,208 B2 | 1/2013 | Slutzky et al. |
| 8,429,223 B2 | 4/2013 | Gilley et al. |
| 8,436,556 B2 | 5/2013 | Eisele et al. |
| 8,446,275 B2 | 5/2013 | Utter, II |
| 8,497,871 B2 | 7/2013 | Zulch |
| 8,508,169 B2 | 8/2013 | Zaharchuk et al. |
| 8,515,785 B2 | 8/2013 | Clark et al. |
| 8,527,213 B2 | 9/2013 | Kailas et al. |
| 8,558,466 B2 | 10/2013 | Curasi et al. |
| 8,609,121 B2 | 12/2013 | Averett et al. |
| 8,660,861 B2 | 2/2014 | Chun et al. |
| 8,690,771 B2 | 4/2014 | Wekell et al. |
| 8,707,619 B2 | 4/2014 | Edwards et al. |
| 8,716,952 B2 * | 5/2014 | Van de Ven ............... F21K 9/00 313/498 |
| 8,795,169 B2 | 8/2014 | Cosentino et al. |
| 8,801,636 B2 | 8/2014 | Lewicke et al. |
| 8,836,243 B2 | 9/2014 | Eisele et al. |
| 8,855,757 B2 | 10/2014 | Kapoor |
| 8,862,532 B2 | 10/2014 | Beaulieu et al. |
| 8,870,740 B2 | 10/2014 | Clegg et al. |
| 8,961,414 B2 | 2/2015 | Teller et al. |
| 9,010,019 B2 | 4/2015 | Mittelmark |
| 9,020,647 B2 | 4/2015 | Johnson et al. |
| 9,044,567 B2 | 6/2015 | Poirrier et al. |
| D734,958 S | 7/2015 | Gosling et al. |
| D737,078 S | 8/2015 | McKinney |
| 9,098,114 B2 | 8/2015 | Potter et al. |
| 9,104,183 B2 | 8/2015 | Zheng et al. |
| 9,125,257 B2 | 9/2015 | Eisele et al. |
| 9,147,296 B2 | 9/2015 | Ricci |
| 9,226,371 B2 | 12/2015 | Mohan |
| 9,230,064 B2 | 1/2016 | Yanev et al. |
| 9,248,309 B2 | 2/2016 | Pugh et al. |
| 9,360,731 B2 | 6/2016 | Berman et al. |
| 9,370,689 B2 | 6/2016 | Guillama et al. |
| D761,598 S | 7/2016 | Goodman |
| 9,392,665 B2 | 7/2016 | Eisele et al. |
| 9,420,667 B2 | 8/2016 | Mohan |
| 9,429,009 B2 | 8/2016 | Paulk et al. |
| 9,430,617 B2 | 8/2016 | Brust et al. |
| 9,430,927 B2 | 8/2016 | Yu et al. |
| 2002/0096121 A1 | 7/2002 | Ingman et al. |
| 2002/0119281 A1 | 8/2002 | Higgins et al. |
| 2002/0128864 A1 | 9/2002 | Maus et al. |
| 2002/0163529 A1 | 11/2002 | Evanicky |
| 2002/0187082 A1 | 12/2002 | Wu et al. |
| 2003/0100837 A1 | 5/2003 | Lys et al. |
| 2003/0133292 A1 | 7/2003 | Mueller et al. |
| 2003/0209501 A1 | 11/2003 | Leung |
| 2004/0060677 A1 | 4/2004 | Huang |
| 2004/0105264 A1 | 6/2004 | Spero |
| 2004/0176666 A1 | 9/2004 | Chait |
| 2004/0178751 A1 | 9/2004 | Mueller et al. |
| 2004/0212321 A1 | 10/2004 | Lys et al. |
| 2004/0264193 A1 | 12/2004 | Okumura |
| 2005/0110416 A1 | 5/2005 | Veskovic |
| 2005/0151489 A1 | 7/2005 | Lys et al. |
| 2005/0177957 A1 | 8/2005 | Long |
| 2005/0191505 A1 | 9/2005 | Akarsu et al. |
| 2005/0200578 A1 | 9/2005 | Lee et al. |
| 2005/0213353 A1 | 9/2005 | Lys |
| 2005/0218870 A1 | 10/2005 | Lys |
| 2005/0231133 A1 | 10/2005 | Lys |
| 2005/0236998 A1 | 10/2005 | Mueller et al. |
| 2005/0253533 A1 | 11/2005 | Lys et al. |
| 2006/0000257 A1 | 1/2006 | Samadpour et al. |
| 2006/0017928 A1 | 1/2006 | Crowther |
| 2006/0103728 A1 | 5/2006 | Ishigami et al. |
| 2006/0111944 A1 | 5/2006 | Sirmans, Jr. et al. |
| 2006/0172579 A1 | 8/2006 | Murphey et al. |
| 2006/0207730 A1 | 9/2006 | Berman et al. |
| 2006/0246149 A1 | 11/2006 | Buchholz et al. |
| 2007/0001617 A1 * | 1/2007 | Pogodayev .......... H05B 41/245 315/224 |
| 2007/0024210 A1 | 2/2007 | Zwanenburg et al. |
| 2007/0115665 A1 | 5/2007 | Mueller et al. |
| 2007/0162858 A1 | 7/2007 | Hurley et al. |
| 2008/0031832 A1 | 2/2008 | Wakefield et al. |
| 2008/0103561 A1 | 5/2008 | Moscovici |
| 2008/0224121 A1 | 9/2008 | Bose et al. |
| 2008/0225021 A1 | 9/2008 | Hekstra et al. |
| 2008/0246629 A1 | 10/2008 | Tsui et al. |
| 2008/0297027 A1 | 12/2008 | Miller et al. |
| 2009/0068089 A1 | 3/2009 | Hussain et al. |
| 2009/0104086 A1 | 4/2009 | Zax et al. |
| 2009/0128044 A1 | 5/2009 | Nevins |
| 2009/0169425 A1 | 7/2009 | Park et al. |
| 2009/0241496 A1 | 10/2009 | Pintault et al. |
| 2009/0242485 A1 | 10/2009 | Cabados |
| 2010/0021710 A1 | 1/2010 | Hunt et al. |
| 2010/0119461 A1 | 5/2010 | Bicard-Benhamou et al. |
| 2010/0169108 A1 | 7/2010 | Karkanias et al. |
| 2010/0197495 A1 | 8/2010 | Filippini et al. |
| 2010/0217099 A1 | 8/2010 | LeBoeuf et al. |
| 2011/0084614 A1 | 4/2011 | Eisele et al. |
| 2012/0011033 A1 | 1/2012 | Salgia |
| 2012/0206726 A1 | 8/2012 | Pervez et al. |
| 2012/0279120 A1 | 11/2012 | Prescott |
| 2012/0298599 A1 | 11/2012 | Sichello |
| 2013/0081541 A1 | 4/2013 | Hasenoehrl et al. |
| 2013/0141235 A1 | 6/2013 | Utter, II |
| 2013/0208576 A1 | 8/2013 | Loree, IV et al. |
| 2013/0229114 A1 | 9/2013 | Eisele et al. |
| 2014/0058566 A1 | 2/2014 | Rains, Jr. et al. |
| 2014/0067130 A1 | 3/2014 | Pillai et al. |
| 2014/0093551 A1 | 4/2014 | Averett et al. |
| 2014/0099348 A1 | 4/2014 | Averett et al. |
| 2014/0283450 A1 | 9/2014 | Darlington |
| 2014/0298719 A1 | 10/2014 | Mackin |
| 2014/0318011 A1 | 10/2014 | Jarvinin et al. |
| 2015/0015152 A1 | 1/2015 | Aboulnaga et al. |
| 2015/0052975 A1 | 2/2015 | Martin |
| 2015/0066578 A1 | 3/2015 | Manocchia et al. |
| 2015/0102730 A1 | 4/2015 | Eisele et al. |
| 2015/0126806 A1 | 5/2015 | Barroso et al. |
| 2015/0212057 A1 | 7/2015 | Darveau |
| 2015/0382427 A1 | 12/2015 | Eisele et al. |
| 2016/0231014 A1 | 8/2016 | Ro et al. |
| 2016/0253802 A1 | 9/2016 | Venetainer et al. |

FOREIGN PATENT DOCUMENTS

| | | |
|---|---|---|
| CN | 1150882 A | 5/1997 |
| CN | 101421558 A | 4/2009 |
| CN | 202551821 U | 11/2012 |
| EP | 1 067 825 B1 | 12/2004 |
| EP | 1 821 582 A1 | 8/2007 |
| EP | 2 132 960 | 12/2009 |
| EP | 2 431 541 A2 | 3/2012 |
| EP | 2 488 912 | 8/2012 |

(56) References Cited

FOREIGN PATENT DOCUMENTS

| | | |
|---|---|---|
| JP | 2001-286226 A | 10/2001 |
| JP | 2001-314882 A | 11/2001 |
| JP | 2005-040769 A | 2/2005 |
| JP | 2006-321721 A | 11/2006 |
| JP | 2008-204640 A | 9/2008 |
| JP | 2010-239878 A | 10/2010 |
| KR | 2000-0009824 A | 2/2000 |
| KR | 2003-0074107 A | 9/2003 |
| KR | 10-2005-0003899 A | 1/2005 |
| KR | 10-0804892 B1 | 2/2008 |
| KR | 10-2012-0004243 A | 1/2012 |
| KR | 10-1102733 B1 | 1/2012 |
| KR | 10/1135926 B1 | 4/2012 |
| KR | 10-2013-0124184 A | 11/2013 |
| WO | 2004/037301 A2 | 5/2004 |
| WO | 2007/026387 A2 | 3/2007 |
| WO | 2008/043396 A1 | 4/2008 |
| WO | 2008/120127 A1 | 10/2008 |
| WO | 2008/135093 A1 | 11/2008 |
| WO | 2009/030641 A1 | 3/2009 |
| WO | 2009/044330 A1 | 4/2009 |
| WO | 2010/046875 A2 | 4/2010 |
| WO | 2010/115720 A2 | 10/2010 |
| WO | 2011/033377 A2 | 3/2011 |
| WO | 2011/046875 A1 | 4/2011 |
| WO | 2012/104773 A1 | 8/2012 |
| WO | 2012/151407 A1 | 8/2012 |
| WO | 2015/130786 A1 | 9/2015 |

OTHER PUBLICATIONS

International Search Report for corresponding PCT Application No. PCT/US2010/051791, dated Feb. 4, 2011.
Eisele et al., "LED Lighting System," Office Action mailed Jun. 5, 2013, for U.S. Appl. No. 13/863,589, 5 pages.
Eisele et al., "LED Lighting System," Response filed Sep. 4, 2013, for U.S. Appl. No. 13/863,589, 3 pages.
Eisele et al., "LED Lighting System," Office Action mailed Nov. 1, 2013, for U.S. Appl. No. 13/863,589, 6 pages.
Eisele et al., "LED Lighting System," Response filed Jan. 27, 2014, for U.S. Appl. No. 13/863,589, 3 pages.
European Search Report for corresponding EP Application No. 15160578.9, dated Aug. 11, 2015, 8 pages.
Eisele et al., "LED Lighting System," Preliminary Amendment filed Dec. 30, 2014, for U.S. Appl. No. 14/486,753, 69 pages.
Eisele et al., "LED Lighting System," Second Preliminary Amendment filed Dec. 30, 2014, for U.S. Appl. No. 14/486,753, 9 pages.
Eisele et al., "LED Lighting System," Office Action mailed Feb. 4, 2015, for U.S. Appl. No. 14/486,753, 7 pages.
Eisele et al., "LED Lighting System," Response filed Mar. 6, 2015, for U.S. Appl. No. 14/486,753, 3 pages.
Eisele et al., "LED Lighting System," Office Action mailed Oct. 22, 2015, for U.S. Appl. No. 14/805,243, 14 pages.
Eisele et al., "LED Lighting System," Response filed Jan. 5, 2016, for U.S. Appl. No. 14/805,243, 3 pages.
Extended European Search Report, dated Jul. 28, 2016, for European Application No. 13833105.3-1853 / 2891019, 17 pages.
International Search Report and Written Opinion of the International Searching Authority, mailed Aug. 29, 2016, for International Application No. PCT/US2016/034416, 22 pages.
Jones, "Acoustical Treatment for Indoor Areas," in *Handbook for Sound Engineers*, Ballou (ed.), Burlington, MA, Focal Press, 2008, 65-94.
Pillai et al., "Systems, Methods and Articles for Enhancing Wellness Associated With Habitable Environments," Amendment, filed Jul. 21, 2016, for U.S. Appl. No. 14/012,444, 25 pages.
Allergy Buyers Club, "Philips Wake Up Light Dawn Simulators Alarm Clocks," retrieved from http://www.allergybuyersclub.com/philips-wake-up-light-dawn-simulator-alarm-clocks.html, retrieved on Aug. 13, 2012, 2 pages.

American Ultraviolet, "Handheld Germicidal Fixtures," retrieved from http://americanultraviolet.com/germicidal_solutions/commercial_products/handheld . . . , retrieved on Aug. 13, 2012, 1 page.
American Ultraviolet, "In Room Germicidal Solutions," retrieved from http://www.americanultraviolet.com, 2 pages.
Averett et al., "Titanium Dioxide Photocatalytic Compositions and Uses Thereof," U.S. Appl. No. 61/482,393, filed May 4, 2011, 25 pages.
Brookstone, "Tranquil Moments® Advanced Sleep Sounds," retrieved from http://www.brookstone.com/tranquil-moments-advanced-sleep-sound . . . , retrieved on Apr. 28, 2014, 3 pages.
Chinese Office Action, dated May 5, 2016, for Chinese Application No. 201380051774.0, 10 pages.
Communication pursuant to Rule 164(1) EPC, dated Mar. 30, 2016, for European Application No. 13833105.3-1853 / 2891019, 9 pages.
Delos, "Delos and MGM Grand Las Vegas Introduce First-Ever Stay Well Rooms," Sep. 20, 2012, retrieved from http://delosliving.com/staywell/delos-mgm-grand-las-vegas-introduce-first-ever-stay-well- . . . retrieved on May 14, 2014, 4 pages.
Delos, "Delos Announces First-Ever WELL™ Certified Office at CBRE Headquarters in Los Angeles," Nov. 19, 2013, retrieved from http://delosliving.com/press-release/delos-the-pioneer-of-wellness-real-estate-announces-fi . . . , retrieved on May 14, 2014, 4 pages.
Delos, "Introducing Wellness Real Estate—Can Your Home Actually Improve Your Health?," May 1, 2012, retrieved from http://delosliving.com/press-release/can-your-home-actually-improve-your-health/, retrieved on May 14, 2014, 3 pages.
Delos, "MGM Grand and Delos Complete Expansion of Stay Well Experience and Introduce New Stay Well Lounge," Feb. 26, 2014, retrieved from http://delosliving.com/press-release/mgm-grand-and-delos-complete-expansion-of-stay-we . . . , retrieved on May 14, 2014, 4 pages.
Delos, "World's First WELL® Certified Restaurants Introduced by Delos and LYFE Kitchen," Dec. 4, 2013, retrieved from http://delosliving.com/press-release/worlds-first-well-certified-restaurants-introduced-by-d . . . retrieved on May 14, 2014, 4 pages.
Delos, "World's First Wellness-Infused Student Housing Model in Philadelphia for St. Joseph's University Introduced by Delos and Cross Properties," Nov. 25, 2013, retrieved from http://delosliving.com/press-release/delos-the-pioneer-of-wellness-real-estate-and-cross-pr . . . , retrieved on May 14, 2014, 4 pages.
Eisele et al., "LED Lighting System," Amendment filed Oct. 24, 2012, for U.S. Appl. No. 12/900,158, 12 pages.
Eisele et al., "LED Lighting System," Notice of Allowance mailed Jan. 9, 2013, for U.S. Appl. No. 12/900,158, 9 pages.
Eisele et al., "LED Lighting System," Notice of Allowance, mailed Apr. 21, 2015, for U.S. Appl. No. 14/486,753, 9 pages.
Eisele et al., "LED Lighting System," Notice of Allowance, mailed Mar. 14, 2016, for U.S. Appl. No. 14/805,243, 6 pages.
Eisele et al., "LED Lighting System," Notice of Allowance, mailed May 13, 2014, for U.S. Appl. No. 13/863,589, 6 pages.
Eisele et al., "LED Lighting System," Office Action mailed Jul. 26, 2012, for U.S. Appl. No. 12/900,158, 13 pages.
Eisele et al., "LED Lighting System," Preliminary Amendment, filed Sep. 15, 2015, for U.S. Appl. No. 14/805,243, 9 pages.
Eisele et al., "LED Lighting System," U.S. Appl. No. 61/249,858, filed Oct. 8, 2009, 58 pages.
Fabrictech International, "PureCare™ Antibacterial Silver," retrieved from http://www.fabrictech.com/shop/purecaresilver.html, retrieved on Aug. 13, 2012, 1 page.
Fabrictech International, "Total Health & Wellness Protection Package," retrieved from http://www.fabrictech.com/shop/custom-package/total-healthawellness-protection.html, retrieved on Aug. 13, 2012, 3 pages.
Goodman, "Green Wall Frame," Amendment After Allowance, filed May 11, 2016, for U.S. Appl. No. 29/528,147, 8 pages.
Goodman, "Green Wall Frame," Notice of Allowance, mailed Feb. 11, 2016, for U.S. Appl. No. 29/528,147, 11 pages.
GSky Plant Systems, Inc., "Smart Wall Cabinet," 2012, retrieved from http://gsky.com/green-walls/smartwall/, retrieved on Apr. 29, 2015, 3 pages.

(56) References Cited

OTHER PUBLICATIONS

International Search Report and the Written Opinion of the International Searching Authority, mailed Jun. 8, 2015, for International Application No. PCT/US2015/017528, 20 pages.

International Search Report, mailed Apr. 28, 2016, for International Application No. PCT/US2016/013215, 5 pages.

International Search Report, mailed Dec. 26, 2013, for International Application No. PCT/US2013/057070, 4 pages.

Jernigan, "Light studies focus on circadian rhythms," BioPhotonics, Jul. 2009, retrieved from http://www.photonics.com/Article.aspx?PID=1&VID=43&IID=396&AID=38995, retrieved on Nov. 3, 2014, 2 pages.

Land et al., "Using Vitamin C to Neutralize Chlorine in Water Systems," *United States Department of Agriculture Forest Service Technology and Development Program*, Apr. 2005, retrieved from http://www.fs.fed.us/t-d/pubs/html/05231301/05231301.html on Mar. 1, 2016, 6 pages.

Mold Inspection California, "Killing Mold With Ozone & Thermal Heat," retrieved from http://moldinspectioncalifornia.com/kill_mold_with_ozone.html, 3 pages.

Oxititan, "Light Powered Protection," retrieved from http://www.oxititan.com, retrieved on Aug. 13, 2012, 2 pages.

Pervez et al., "Photonic Crystal Spectrometer," U.S. Appl. No. 61/349,570, filed May 28, 2010, 52 pages.

Pervez et al., "Photonic Crystal Spectrometer," U.S. Appl. No. 61/278,773, filed Oct. 12, 2009, 78 pages.

Pillai et al., "Systems, Methods and Articles for Enhancing Wellness Associated With Habitable Environments," Preliminary Amendment, filed Mar. 25, 2015, for U.S. Appl. No. 14/012,444, 149 pages.

Pillai et al., "Systems, Methods and Articles for Enhancing Wellness Associated With Habitable Environments," Office Action, mailed Mar. 22, 2016, for U.S. Appl. No. 14/012,444, 29 pages.

Suryadevara et al., "Sensor Data Fusion to determine Wellness of an Elderly in Intelligent Home Monitoring Environment," IEEE, 2012, 6 pages.

Vitashower Corp., "Ascorbic Acid Reduction of Residual Active Chlorine in Potable Water Prior to Halocarboxylate Determination," *Journal of Environmental Monitoring* 2(3): 253-256, 2000, 2 pages.

Vitashower Corp., "Frequently Asked Questions," retrieved from http://www.vitashowercorp.com/FAQs.html, retrieved on May 13, 2014, 3 pages.

Vitashower Corp., "Products," retrieved from http://www.vitashowercorp.com/products.html, retrieved on May 13, 2014, 8 pages.

Vitashower Corp., "Welcome to Vitashower Corporation," retrieved from http://www.vitashowercorp.com/index.html, retrieved on May 13, 2014, 4 pages.

Written Opinion of the International Searching Authority, mailed Apr. 28, 2016, for International Application No. PCT/US2016/013215, 16 pages.

Written Opinion, mailed Dec. 26, 2013, for International Application No. PCT/US2013/057070, 5 pages.

\* cited by examiner

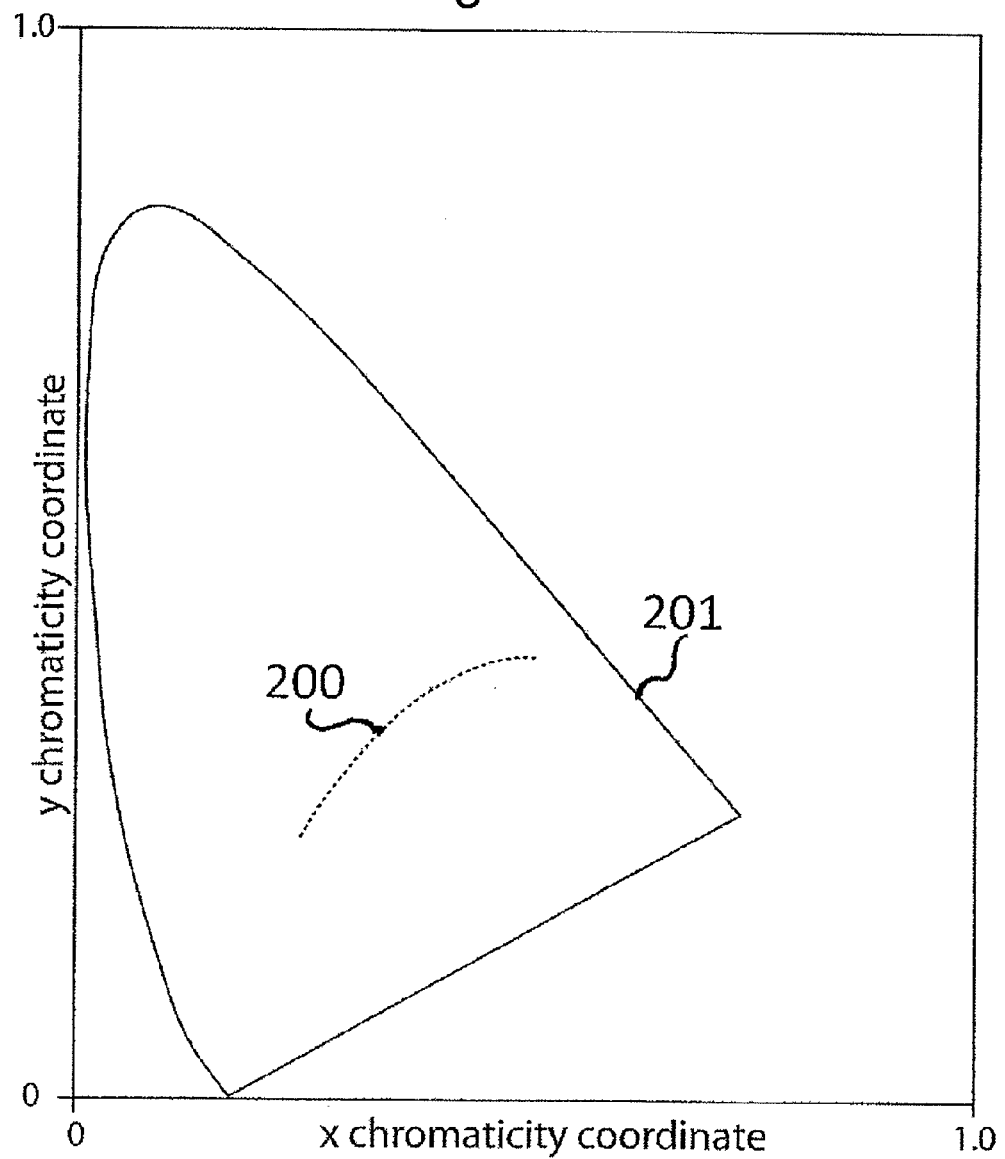

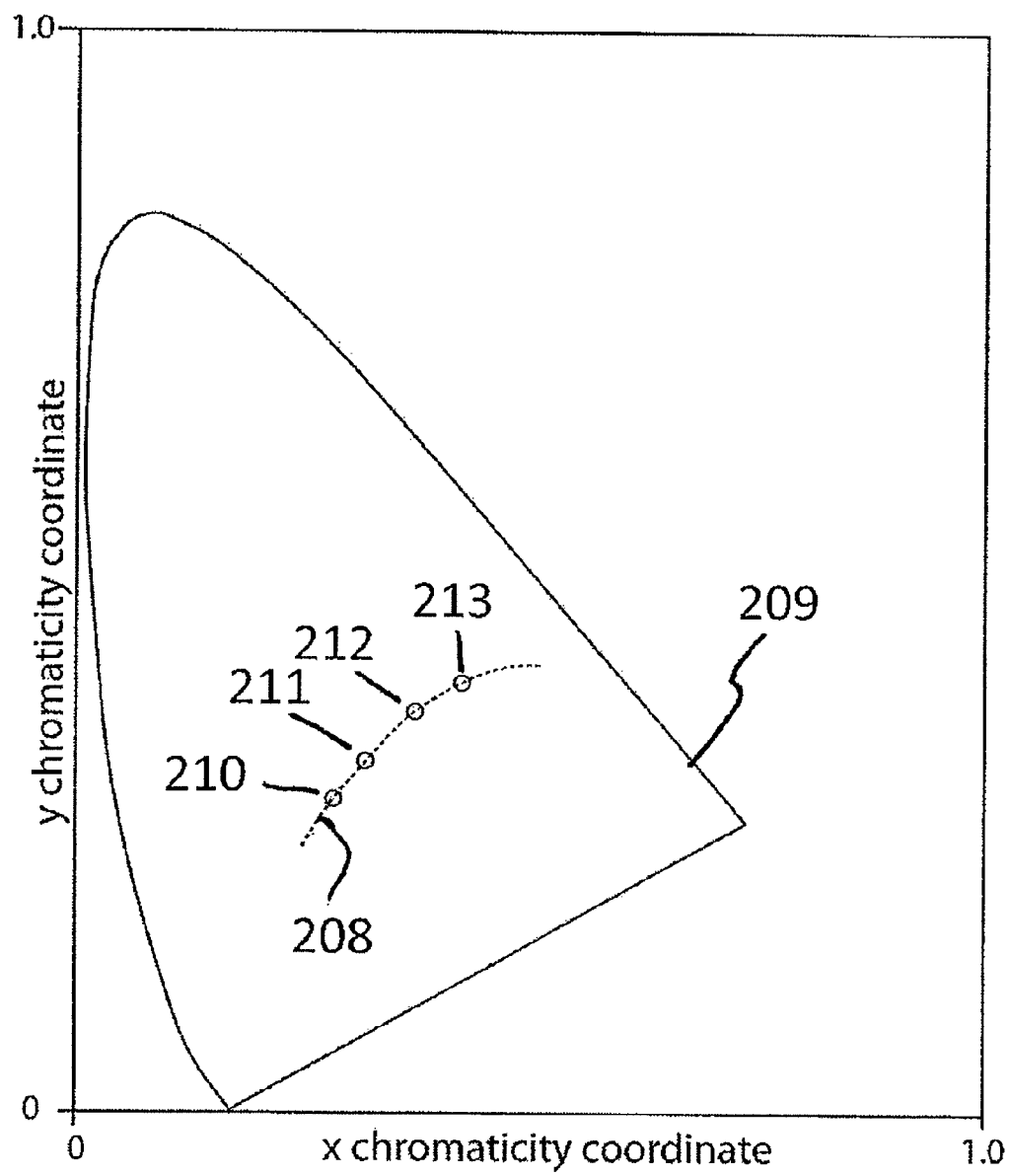

$$\text{air mass} = \frac{1}{\cos \varnothing_z + 0.50572(96.07995 - \varnothing_z)^{-1.6364}}$$

Fig 21
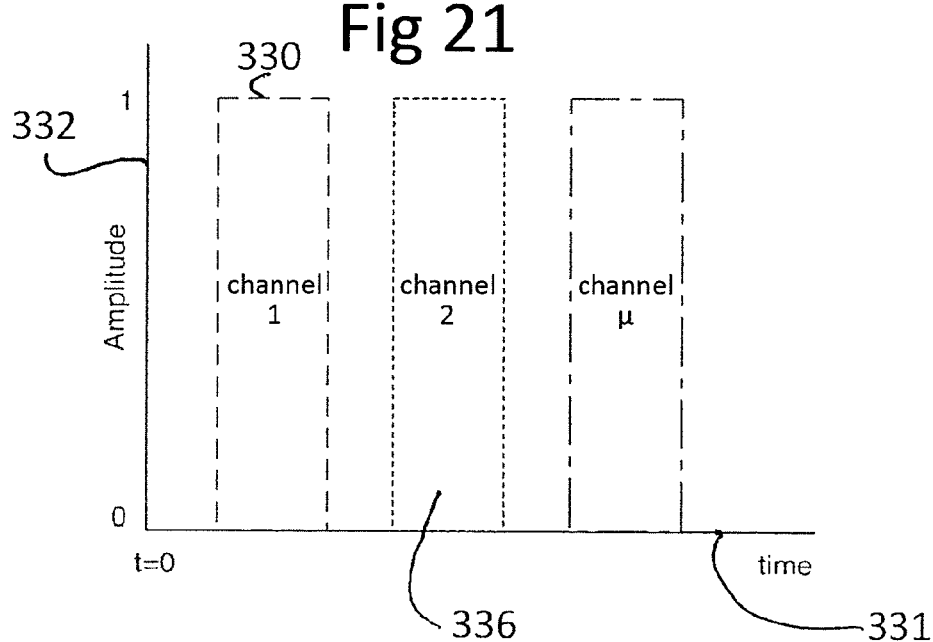
Fig 22
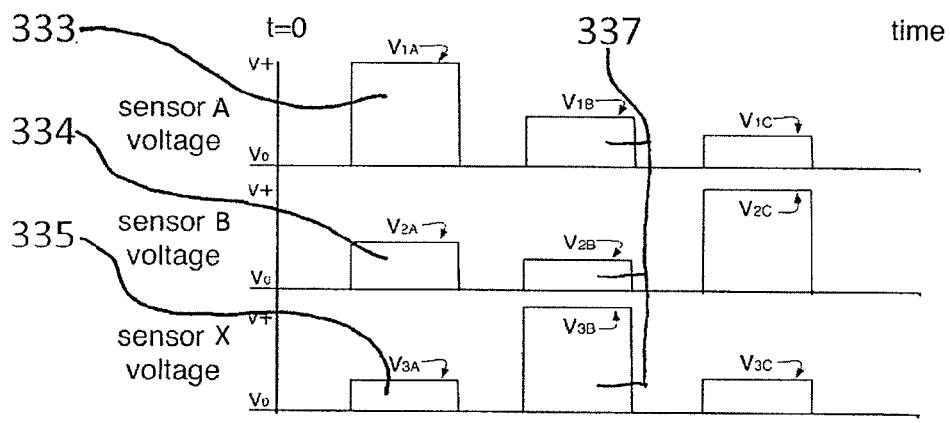
Fig 23
| | Channel 1 | Channel 2 | Channel μ | Condition ß | Condition Ω |
|---|---|---|---|---|---|
| sensor A | $V_{A1}$ | $V_{A2}$ | $V_{Aμ}$ | $V_{Aß}$ | $V_{AΩ}$ |
| sensor B | $V_{B1}$ | $V_{B2}$ | $V_{Bμ}$ | $V_{Bß}$ | $V_{BΩ}$ |
| sensor X | $V_{X1}$ | $V_{X2}$ | $V_{Xμ}$ | $V_{Xß}$ | $V_{XΩ}$ |

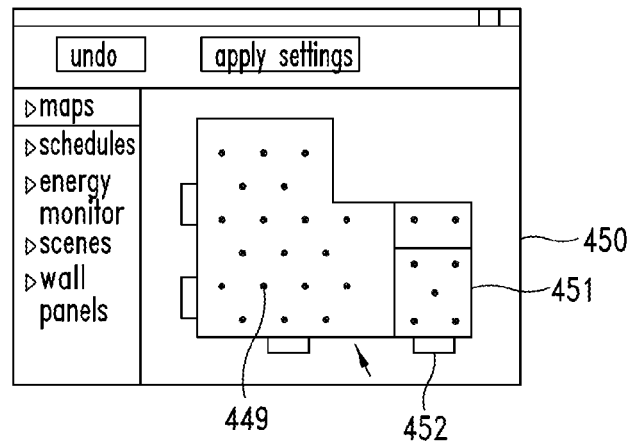
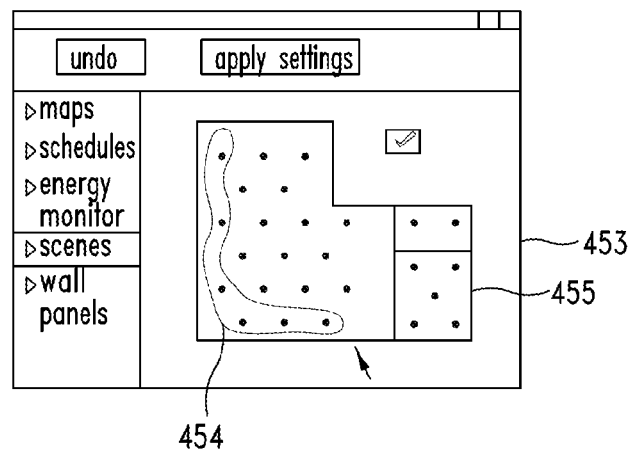
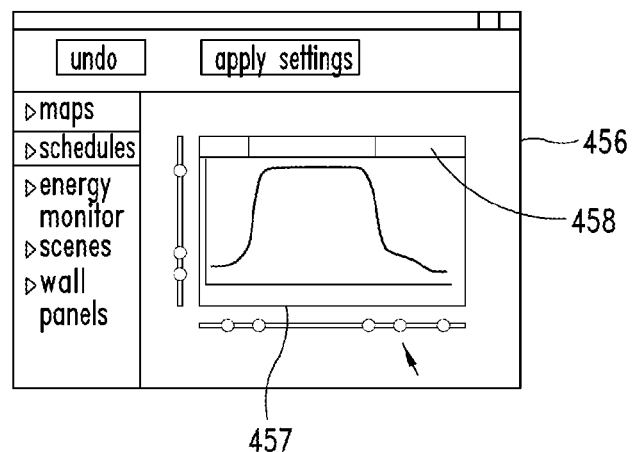
*FIG. 34*

LED LIGHTING SYSTEM

BACKGROUND

Technical Field

The present invention generally relates to the field of lighting devices, and more particularly, to a system and method of controlling lighting fixtures for coordinating precise brightness and color schedules so as to closely resemble sunlight on a cloudless day in spectral characteristics.

Description of the Related Art

With growing demand for energy efficient lighting, new lighting technologies such as LEDs offer distinct opportunities due to their customizable colors and precision in control. As the white LED lighting market grows, advancing the state of the art entails a seamless integration of artificial light with natural light and healthful lighting through dynamic lighting.

One particular niche of such LED design and control is in the generation of artificial sunlight for variety of reasons, especially for treating human ailments, e.g., circadian rhythm disorders, seasonal affection disorders, shift work conditions, etc.

U.S. Pat. No. 6,350,275 (Vreman et al.) relates to a pair of personal glasses with built in LED's within 3 cm of the eye which directs red and blue light into the user's eyes to treat circadian rhythm disorders. However, this invention is limited to one user, must be worn during the working period and does not simulate natural sunlight.

The following patents propose similar methods of treating circadian rhythm disorders, but wherein they do not replicate natural sunlight conditions, involve a portable or wearable device, involve treatment periods which are intermittent and require that the patient engage with the device, or involve chromatic properties of treatment light which are not defined: U.S. Pat. No. 5,503,637 (Kyricos, et al.); U.S. Pat. No. 6,053,936 (Koyama, et al.); U.S. Pat. No. 5,197,941 (Whitaker); U.S. Pat. No. 5,545,192 (Czeisler, et al.); U.S. Pat. No. 5,176,133 (Czeisler, et al.); and U.S. Pat. No. 5,304,212 (Czeisler, et al.).

Examples of other lighting control systems are mentioned below:

U.S. Pat. No. 7,014,336 (Ducharme, et al.) relates to active circuitry with a feedback mechanism for reading the light in the room and actively adjusts. In particular, the invention relates specifically to color temperature variable lighting fixtures but without relating a specific region of the blackbody curve or chromaticity diagram. It also does not appear to teach or suggest a method for automatically adjusting the color temperature and brightness of the lighting fixtures without user input.

U.S. Pat. No. 7,213,940 (Van De Ven et al.) involves reducing light with specific coordinates (dimming and feedback) utilizing different families of LED emitters and adjusts for specific output at constant color temperature at a sacrifice of brightness. This patent is also static embedded systems with controls within the fixture. This invention relates to a variable color temperature adjustable over time with active controls. In particular, the invention involves a specific 5-sided bounding box on the CIE (Commission Internationale de l'Eclairage) 1931 chromaticity diagram. It specifies that a first group of lighting elements must have chromaticity coordinates at a first point (defined) and a second group must have coordinates falling within the defined box. Additionally, this patent relates to a lighting fixture producing a fixed color temperature.

U.S. Pat. No. 7,354,172 (Chemel, et al.) relates to rendering lighting conditions based on a reference color gamut common to many lighting units in a network using white and monochromatic LEDs. This patent does not specifically define the color gamut or the colors or chromaticity coordinates the fixture operates at, and does not appear to teach or suggest a means by which brightness and color are autonomously and dynamically changed with time.

U.S. Pat. No. 6,459,919 (Lys, et al.) discloses illumination of living tissues where known light parameters relate to a condition of the living tissue. This is discussed in the context of using light to identify abnormal features and pathological conditions of tissues, living matter, and other materials. The therapeutic applications mentioned in the background extend only to diagnostic methods, and do not appear to teach or suggest using lighting conditions to stimulate a biological response.

U.S. Pat. No. 6,441,558 (Muthu, et al.) relates to a fixture employing red, green, and blue LEDs and a control mechanism such that the fixture outputs a constant color temperature and brightness.

U.S. Pat. No. 6,340,868 (Lys, et al.) relates to lighting units on a network capable of receiving addressing commands and controls for controlling a plurality of LEDs in each unit. However, this invention does not deal with methods by which lighting conditions are changed (i.e., color schedules), specific chromatic regions the fixtures recreate, or methods to ensure color consistency (i.e., feedback loops or sensors).

U.S. Pat. No. 7,173,384 (Plotz, et al.) relates to recreating a predetermined region on a CIE chromaticity diagram using pulse width channels of red, green, and blue LEDs arranged in channels of up to six.

U.S. Pat. No. 7,067,995 (Gunter, et al.) discloses the use of a temperature sensor and calibrations, along with sensor calibration data storage at various reference temperatures as a means of correcting color fluctuations related to the thermal state of the LEDs.

U.S. Pat. No. 6,992,803 (Chang) relates to a feedback mechanism which calculates the chromaticity coordinates of each lighting element in a lighting fixture to calculate the proper operating conditions necessary to reproduce a specific chromaticity coordinate.

U.S. Pat. No. 6,683,419 (Kriparos) discloses a method by which LEDs, with linear dimming-brightness curves, mimic incandescent bulbs, which have exponential dimming-brightness curves. The invention involves the dimming-brightness relationship in an LED fixture and does not appear to teach or suggest changing color with dimming level.

U.S. Pat. No. 7,327,337 (Callahan) involves a series of lighting devices connected to a two wire power bus in which the color modulation signals are transmitted through the power connection and demodulated in the lighting device.

U.S. Pat. No. 6,806,659 (Mueller, et al.) covers a lighting control network for LED luminaires as well as various LED lighting fixtures for several applications. See also U.S. Patent Publication No. 20040178751 (Mueller, et al.).

U.S. Pat. No. 4,962,687 (Belliveau, et al.) deals with variable colors in a lighting system achieved by dimming circuitry within fixtures. It does not appear to cover specific chromatic regions rendered using a control feedback loop.

U.S. Pat. No. 5,350,977 (Hamamoto, et al.) involves a variable color temperature fixture, and does not incorporate a means of autonomously and dynamically changing the color temperature and or brightness with respect to the time of day or geographic location.

U.S. Pat. No. 5,357,170 (Luchaco, et al.) claims a control system where preset conditions can be changed by the occupant by moving a physical member or slider control to change the maximum brightness levels of the system. This patent does not appear to address color modulation over time or lighting schedules or programs.

U.S. Pat. No. 7,288,902 (Melanson) deals first with a lighting fixture with two unique lighting elements, each possessing a fixed color temperature, which are then dimmed at different ratios relative to the AC power dimming level to achieve a variable color temperature with dimming level. This patent claims only "white" and "yellow" LEDs, and does not appear to teach or suggest the ratios or specific chromatic region rendered by the lighting device. This patent also does not appear to teach or suggest any method by which a control system can interface with a fixture, or any method by which the brightness and color temperature of the fixture can be controlled independently.

U.S. Pat. No. 6,720,745 (Lys, et al.) discloses the use of the RS-485 standard to control a plurality of LED devices.

U.S. Pat. No. 7,215,086 (Maxik), issued relates to integrating the fixture designs within the Lutron Circuits to achieve diming levels below 5% through pulse modulation. This invention utilizes a square wave which has been discussed in prior art.

U.S. Pat. No. 5,193,900 (Yano, et al.) discloses a device which detects natural light and mechanically actuates a filter on an artificial light source.

U.S. Pat. No. 6,554,439 (Telcher, et al.) teaches a method of treating circadian rhythm disorders using light sources and a rotating filter.

U.S. Pat. No. 7,446,303 (Maniam, et al.) discloses an ambient light sensor suitable for determining lighting conditions, but does not practice a lighting device or a system of lighting devices.

U.S. Pat. Nos. 7,387,405 and 7,520,634 (Ducharme, et al.) pertain to a system of lighting devices capable of producing a broad range of lighting conditions, however they do not utilize a specific collection of at least three lighting elements of a characteristic chromaticity (as is disclosed in the present application, as will be discussed later), and do not teach a method by which the user can prescribe a particular flux of blue light within white light.

U.S. Pat. No. 7,319,298 (Jungwirth, et al.) relates to a luminaire system which produces light of a desired chromaticity and luminous flux output with varying ambient temperature. The prior art teaches a method by which the luminaire regulates chromaticity throughout changing temperatures using sensors.

U.S. Pat. No. 5,721,471 (Begemann, et al.) discloses a lighting system which manipulates artificial lighting based on actual lighting conditions, determined either by a light sensor exposed to natural light or by the calendar day and time of day. It also discusses modification to artificial lighting conditions based on a modification to present mean day-lighting levels. In contrast (as will be discussed in detail later), the present invention relates a desired result or circadian response to the generation of signals to control lighting devices and the ultimate generation of artificial light. This method of input is based on user preference rather than a prescriptive input based on a default time of day or existing lighting conditions for a fixed geographic location. The present invention allows the user to adjust for jet lag after travel, maintain the lighting conditions of a fixed geographic location throughout any location, coordinate the circadian rhythm to a cycle other than 24 hours, or specify a desired circadian response or condition.

U.S. Pat. No. 7,679,281 (Do Hyung, et al.) teaches a lighting device with three lighting elements, two of which comprise an LED chip combined with a phosphor of a specific composition and a third LED chip which emits light in the visible range of 580 nm or more. This third lighting device emitting visible light of 580 nm is described as a lighting element which produces light of 3000K or less, however no specific spectral distributions of light are disclosed. In contrast (and as will be discussed in detail later), the present invention relates to a collection of lighting elements with specific chromaticity characteristics such that the flux of blue light can be precisely controlled through independent modulation of each lighting element while maintaining high color rendering index of the artificial white light. The selection of the lighting elements in the present invention may comprise any collection of lighting elements which produce light in the characteristic chromaticity regions described in FIGS. 13A-14B of the present application. Furthermore, it is within the scope of the present invention that any lighting device of a characteristic chromaticity illustrated in FIGS. 13A-14B of the present application be used to generate artificial light of high color rendering index in the range of 1800-6500K. These lighting devices may be composed of (but are not limited to) LED chips, LEDs combined with phosphors, LED chips combined with quantum dots, LED chips combined with photonic crystals, organic light emitting diodes (OLED), or polymeric LED devices (PLED).

U.S. Patent Publication No. 20030133292 (Mueller, et al.) discloses many applications of color temperature variable lighting. Daylight simulation and circadian rhythm disorder treatment is not mentioned.

U.S. Patent Publication No. 20030100837 (Lys, et al.) relates to therapeutic effects achieved with LED devices; it claims: an LED system for generating a range of colors within a color spectrum, selecting from the range of colors a set of colors, whereby the set of colors produces in the patient a therapeutic effect, and illuminating an area of the patient with the set of colors for a period of time predetermined to be effective in producing the therapeutic effect. The patent does not appear to identify the range of colors which produce the therapeutic effect, nor does it appear to identify a period of time or method of modulation of the light to facilitate this therapeutic effect.

See also the following U.S. patent publications regarding LED lighting controls: U.S. Patent Publication Nos. 20050253533 (Lys, et al.); 20050236998 (Mueller, et al.); 20050231133 (Lys); 20050218870 (Lys); 20050213353 (Lys); 20050200578 (Lee, et al.); 20050151489 (Lys); 20040212321 (Lys, et al.); and 20040105264 (Spero).

However, despite the foregoing, there remains a need for a system and method that generates broad spectrum white light of color temperatures 1800K to 6500K in interior spaces using general lighting fixtures (e.g., for treating circadian rhythm disorders) and wherein brightness and color are autonomously and dynamically changed with time and while using combinations of white LEDs and color LEDs. Furthermore, there remains a need for such a system and method that does not require calculating chromaticity coordinates but rather uses calibration values of sensor outputs at specific color temperatures and preferably, for controlling a feedback loop, and a color matching algorithm.

BRIEF SUMMARY

The invention also comprises a novel method to control lighting devices (e.g., novel methods of interpreting given user input into control signals which translate to a specific point on the daylight locus or color temperature) as well as a novel lighting device. This is significant because variable color temperature fixtures (e.g., those shown in the prior art) are designed to be controlled, operated, or programmed by lighting designers or advanced users. As will be discussed in detail below, the present invention incorporates methods by which simple inputs are translated into appropriate signals for controlling a multi-channel lighting device. These simple inputs may comprise 1) dimming level;
2) dimming level and color temperature level;
3) time of day;
4) time zone;
5) geographic location;
6) desired circadian response;
7) present activity (e.g., sleep, reading, working, studying, eating, resting, etc.); and
8) angle of sun.

These inputs can be manually inputted to the system or they can be automatically fed to the system from sensors (e.g., clocks, global positioning systems, etc.).

A further input to this novel system is the flux of color light, and more preferably, the flux of blue light flux of blue light (specifically 464 nm). Furthermore, "blue light", referred to as specifically 464 nm light, is meant to be interpreted to be broad spectrum blue light with a concentration (spectral peak) at approximately 464 nm.

Also note that a lighting system with a shorter range of 3500-5000K for example can still satisfy the requirements to coordinate circadian rhythms by regulating output of blue light (specifically the flux of 464 nm light). It is within the scope of the invention that a lighting device comprising at least three lighting elements of characteristic chromaticity illustrated in FIGS. 13A-14B may be limited to the range of 3000-6000K for example based on the balance of lighting elements in the fixture. Furthermore, a lighting device comprising at least three lighting elements of the characteristic chromaticity illustrated in FIGS. 13A-14B where each lighting device outputs at any flux level is within the scope of the present invention.

In one example, the circadian rhythm of a subject is regulated or affected by artificial light where the flux of blue light (specifically 464 nm) is adjusted through changes in color temperature, brightness, or both. This example teaches that even warm white light contains a quantity of blue light which can influence a circadian response, and that light of a constant color temperature can be modulated in intensity to induce a circadian response.

It should be noted that because the prior art does not take into account the flux of light in the blue region (specifically 464 nm) in white light control mechanisms, methods, and systems, it is possible that prescriptive efforts to regulate a subject's circadian rhythm can have undesirable results since all white light contains blue light. Because of this, simple modulation of color temperature alone is not adequate to affect a desired circadian response.

Note the fact that users may want to adjust lighting to emulate very warm, dimmed incandescent lighting with a characteristic color temperature of 1800-2400K. This characteristic color temperature also contains a very small fraction of irradiance in the blue region (in particular the 464 nm wavelength) compared to light in the 5000-6500K region. A lighting system of fixtures capable of producing light in the 1800-2400K region offers the user more options to coordinate lighting in such a way that the circadian rhythm is not disrupted by blue light.

A system is disclosed for artificially generating sunlight in accordance with a daytime locus using spectral characteristics that resembles sunlight (including other variations of daytime sunlight such as diffuse lighting, e.g., cloudless, partially cloudy, overcast, foggy, rainy, snowy, etc.). The system automatically controls at least one lighting fixture substantially along a daytime locus (e.g., white light of color temperature from 1800K to 6500K) to generate the artificial sunlight.

A method is disclosed for artificially generating sunlight in accordance with a daytime locus using spectral characteristics that resembles sunlight (including other variations of daytime sunlight such as diffuse lighting, e.g., cloudless, partially cloudy, overcast, foggy, rainy, etc.). The method comprises: providing a plurality of channels of lighting elements (e.g., at least three channels); activating the plurality of channels to generate a composite light mixture; detecting the composite light mixture; and controlling the plurality of channels of lighting elements based on the detected composite light mixture to generate artificial sunlight mixture (e.g., white light of color temperature from 1800K to 6500K) along the daytime locus.

An artificial sunlight system is disclosed wherein the system comprises a lighting fixture whose light output is automatically controlled to reduce the effects of, or treat, one of the group of circadian rhythm disorders, shift work dysfunction and seasonal affective disorder by operating along a daytime locus (e.g., white light of color temperature from 1800K to 6500K) to provide compensating artificial sunlight.

A method is disclosed for artificially generating sunlight in accordance with a daytime locus (e.g., white light of color temperature from 1800K to 6500K) using spectral characteristics that resembles sunlight (including other variations of daytime sunlight such as diffuse lighting, e.g., cloudless, partially cloudy, overcast, foggy, rainy, etc.). The method comprises: providing a plurality of channels of lighting elements; activating the plurality of channels to generate a composite light mixture; detecting the composite light mixture; and controlling the plurality of channels of lighting elements based on the detected composite light mixture to generate artificial sunlight along the daytime locus for reducing the effects of, or treating, one of the group of circadian rhythm disorders, shift work dysfunction and seasonal affective disorder by operating along the daytime locus to provide compensating artificial sunlight.

A system for artificially generating sunlight in accordance with a daytime locus (e.g., white light of color temperature from 1800K to 6500K) using spectral characteristics that resembles sunlight (including other variations of daytime sunlight such as diffuse lighting, e.g., cloudless, partially cloudy, overcast, foggy, rainy, snowy, etc.). The system automatically controls at least one lighting fixture substantially along the daytime locus to generate the artificial sunlight wherein the system automatically changes brightness levels and color levels of a plurality of lighting element channels within the at least one lighting fixture that generates broad spectrum white light of color temperatures from 1800K to 6500K in accordance with a user-selected input. Furthermore, the system controls a total flux of blue light (e.g., 464 nm) from a relative level of 1 to 100% of a maximum blue light flux within the broad spectrum white light.

A method is disclosed for artificially generating sunlight in accordance with a daytime locus (e.g., white light of color temperature from 1800K to 6500K) using spectral characteristics that resembles sunlight (including other variations of daytime sunlight such as diffuse lighting, e.g., cloudless, partially cloudy, overcast, foggy, rainy, snowy, etc.). The method comprises: providing a plurality of channels of lighting elements (e.g., at least three channels); activating the plurality of channels to generate a composite light mixture; detecting the composite light mixture; controlling a total flux of blue light (e.g., 464 nm) which can be adjusted from a relative level of 1 to 100% of a maximum blue light flux of said composite light mixture; and controlling said plurality of channels of lighting elements based on said detected composite light mixture to generate artificial sunlight along the daytime locus having a broad spectrum white light of color temperatures from 1800K to 6500K.

It should be understood that although the preferred color temperature range of operation of the present system and method is 1800K to 6500K, this is by way of example only and may vary. The important feature of the present invention is the artificial generation of a whole range of sunlight scenarios (such as diffuse lighting, e.g., cloudless, partially cloudy, overcast, foggy, rainy, snowy, etc.) which includes any type of sunlight that occurs during the daytime using direct lighting. Thus, it is within the broadest scope of the present invention to include the artificial generation of all kinds of sunlight, including diffuse lighting (e.g., diffuse UV radiation) via the system/method of the present invention.

In addition, the phrase "daylight locus" as used throughout this Specification is close in proximity to the Planckian Blackbody Curve.

BRIEF DESCRIPTION OF THE SEVERAL VIEWS OF THE DRAWINGS

The invention will be described in conjunction with the following drawings in which like reference numerals designate like elements and wherein:

FIG. 1A shows a blackbody curve on a 1931 CIE XY chromaticity diagram, depicting the chromatic regions over which the present invention operates;

FIG. 2 illustrates four points on an XY chromaticity diagram corresponding to Kelvin scale-correlated color temperatures of 6500K, 5400K, 4200K and 3200K;

FIG. 21 is an amplitude vs. time plot for three groups (by way of example only) of lighting elements in close spatial proximity wherein each group is activated sequentially in time during calibration;

FIG. 22 depicts the sensor output voltages that monitor each lighting element in each group when they are activated for calibration;

FIG. 23 is a chart of the recorded sensor voltages for each element in each group during calibration;

FIG. 34 depicts three exemplary user control panels within a graphical user interface;

DETAILED DESCRIPTION

Figure 1B:
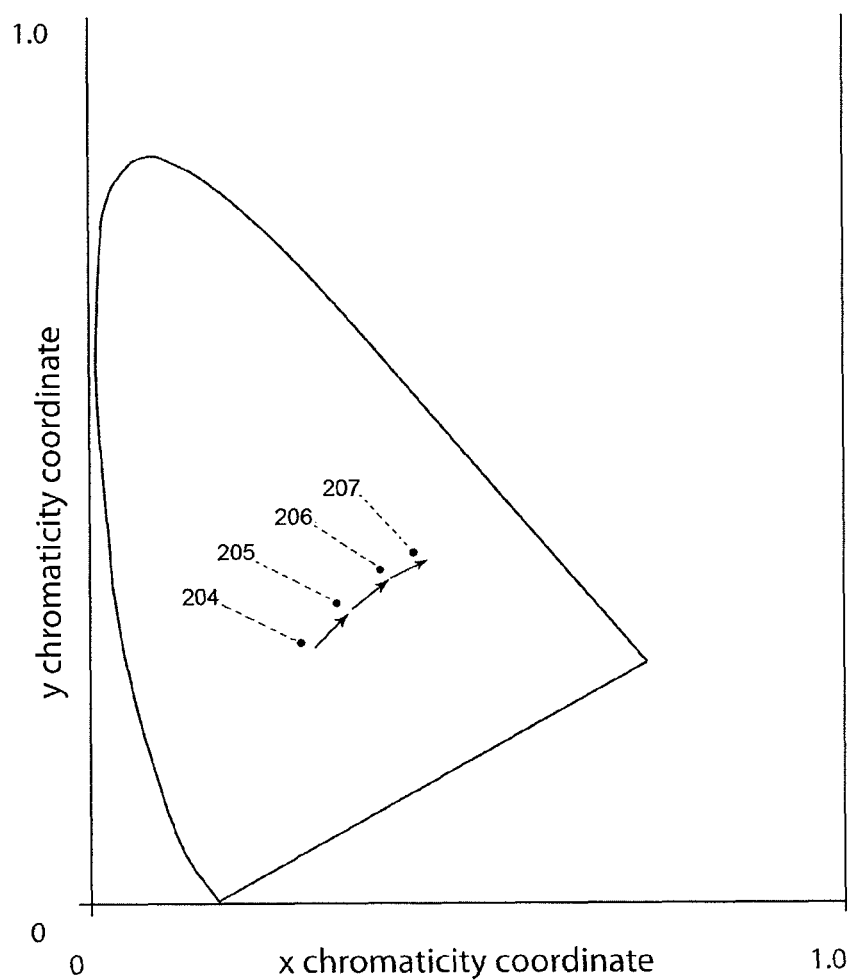
FIG. 1B depicts the chromaticity change of the sunlight as the sun progresses through the day.

Although there are many uses of the invention of the present application, one of the most important is circadian rhythm applications. Circadian rhythm disturbances may be circadian rhythm imbalances, hormonal imbalances activated by exposure to light, shift work condition, or seasonal affective disorder. In particular, the invention of the present application comprises a lighting system which can treat and prevent circadian rhythm disorders. Also included within the broadest aspect of this invention are other applications where prevention of shift work dysfunction, seasonal affective disorder, and circadian rhythm disorders is mission critical, such as military applications (including navy vessels) and manned aerospace applications. Furthermore, the utility of the present invention can be invoked in geographic locations where the sky is often overcast or sunlight is scarce. The invention would equally apply to travelers since jet lag is related to the circadian rhythm. This application has customers in the passenger rail industry, airline industry, and hospitality industry.

Furthermore, the benefits of low glare, high CRI (Color Rendering Index) daylight white lighting extend beyond health benefits. Studies have shown increases in productivity, retail sales, and classroom performance in daylight-lit spaces. For these reasons, the present invention can provide greater efficiencies in retail applications, office and commercial applications, and education/higher education applications. In fact, retailers may find it useful to display their products in the optimal type of light, to further enhance every bit of the shopping experience. Restaurants which serve patrons from morning through the evening often use several circuits of incandescent lights or dimmers to change the lighting conditions throughout the day. A lighting system, such as the present invention, that keeps patrons comfortable at breakfast while being able to deliver a warm intimate atmosphere at cocktail hour is particularly appealing in this regard.

In FIG. 1A, the blackbody curve 200 (also referred to as the "daylight locus") is plotted on a 1931 CIE (Commission Internationale de l'Eclairage) XY chromaticity diagram 201, illustrating the chromatic regions through which the invention operates. In FIG. 2, four points 210, 211, 212, and 213 are represented on a similar XY chromaticity diagram 209 on the blackbody curve 208 corresponding to the Kelvin scale correlated color temperatures (CCT) of 6500K, 5400K, 4200K, and 3200K—an alternate method of specifying regions on the chromaticity diagram.

FIG. 1B depicts the relative positions on the XY chromaticity diagram where direct sunlight may be characterized by measure of air masses traversed at ground level. Reference point 204 indicates the point where direct sunlight with clear skies at an air mass of 1.0 would be positioned on the CIE chromaticity diagram, which is accepted to be approximately 6500K by measure of correlated color temperature by those skilled in the art. Reference point 205 corresponds to an air mass of >1, while reference points 207 and 208 correspond to higher air masses ≥5 and ≥10, respectively. This bounding box encloses the blackbody curve along which the sun's chromaticity coordinates vary from 1-37 air masses. Special considerations are given for spectral shifts during the lifetime of the lighting fixture, ensuring that after the lighting elements decay, the bounding box will sufficiently cover the chromaticity points corresponding to the sun's spectral distribution between air masses 1 and 37.

Figure 3:
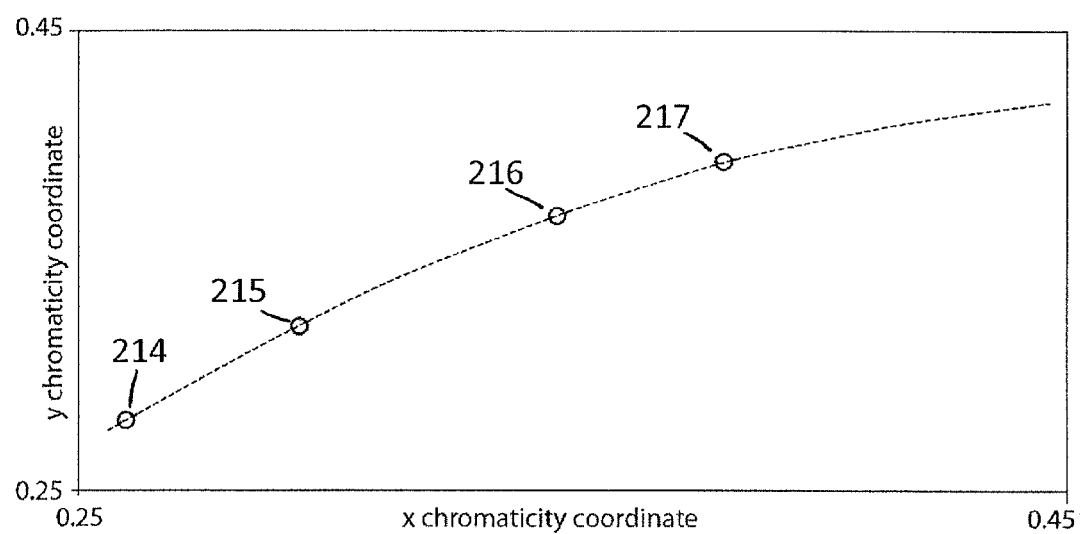
FIG. 3 is an enlargement of the XY chromaticity diagram of FIG. 2 corresponding to the Kelvin scale-correlated color temperatures of 6500K, 5400K, 4200K and 3200K.

For the purposes of describing white light, it is useful to truncate the CIE 1931 chromaticity diagram to the region of interest. The diagram in FIG. 3 shows correlated color temperature in degrees Kelvin at points 214 (6500K), 215 (5400K), 216 (4200K), and 217 (3200K) in a similar fashion as FIG. 2.

Bounding boxes 230, commonly referred to as "bins" by those versed in the art, are represented on an x-y chromaticity diagram 231. A bounding box, or bin, can be described by four coordinate points on the chromaticity diagram. A bin describes a sampling of lighting elements possessing a distribution of chromaticity characteristics defined within the bounding box, and various nomenclature systems may be used to describe individual bounding boxes or bins, a term used by those practiced in the art. A sampling of many lighting element's chromaticity characteristics can be plotted on a chromaticity coordinate system and arranged into bins, where the chromaticity characteristics are determined by optical testing. The dimensions of the bin (area on the x-y chromaticity chart) describes the variation in the spectral distribution for a given sample of similar lighting elements.

Any lighting element is subject to various modes of optical decay, dissipation, or degradation. These modes of decay may be related to brightness decreases (lumen decay) or spectral shifts throughout the lifetime of the lighting element. Spectral shifts may also occur due to the thermal state or variations in the operating voltage of a lighting element. Many solid state lighting elements produce broad spectrum light by down converting high frequency monochromatic light (herein referred to as excitation source) into broad spectrum lower frequency emission using specialized downconverters or lumiphors. These downconverters may consist of phosphors, quantum dots, organic semiconducting materials, photonic crystals, nano photonic crystals, and other photonic crystals. These various downconverters are subject to modes of degradation or decay, such as quantum efficiency decay, spectral shifting, thermal decay, oxidation, excitation peak shifts, and emission shift to name a few.

Figure 4:
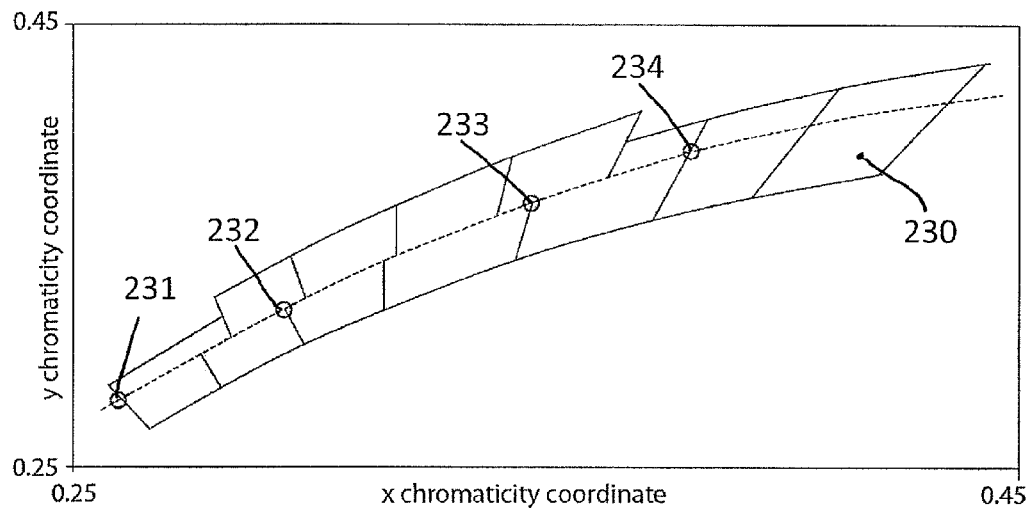
FIG. 4 depicts an initial condition of chromaticity x, y coordinates for exemplary lighting elements.

Four lighting element at points 231, 232, 233, and 234 possessing unique specific chromaticity coordinates are represented at an initial condition in FIG. 4. In such initial condition, the thermal state attribute, forward voltage attribute, lifetime attribute, degradation state, or a combination of any of these attributes is within predetermined limits. It should be noted that the thermal state attribute describes the junction temperature, influenced by ambient temperature, lighting fixture temperature, or increased temperature due to operation. The lifetime attribute describes the total active operating time, and the degradation state describes the condition of the lighting element due to events such as oxidation, over heating, or operating time brightness decay.

Figure 5:
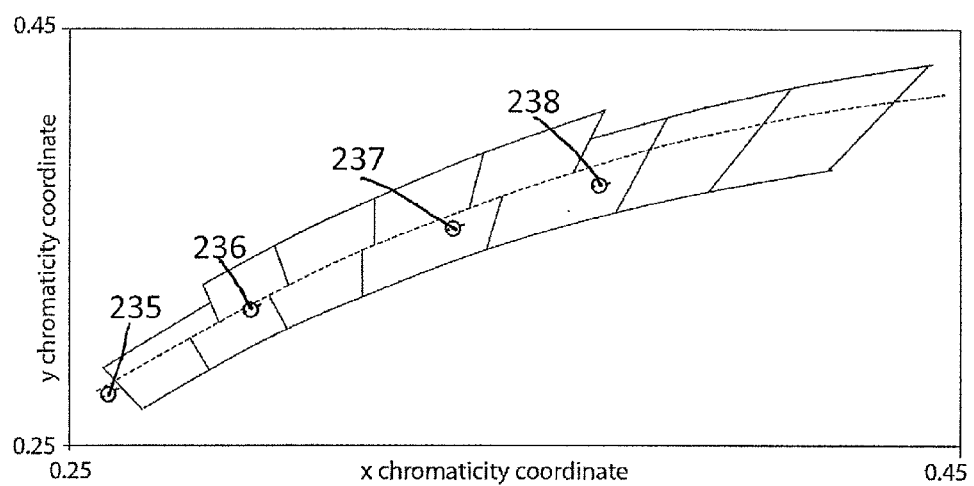
FIG. 5 depicts the chromaticity x,y coordinates for the exemplary lighting elements of FIG. 4 but at after 50,000 hours.

In a second condition, one or a combination of several operating attributes has changed from the initial condition. Changing one or a combination of these attributes causes a change in the lighting element's optical chromaticity coordinate, shown in FIG. 5 for points 235, 236, 237, and 238. For example, in the initial condition described by FIG. 4, the lighting elements have not been operated and are at a lifetime of 0 hours. In the second condition described by FIG. 5, the lighting elements have been operated for 50,000 hours and possess different chromaticity x, y coordinates.

Figure 6:
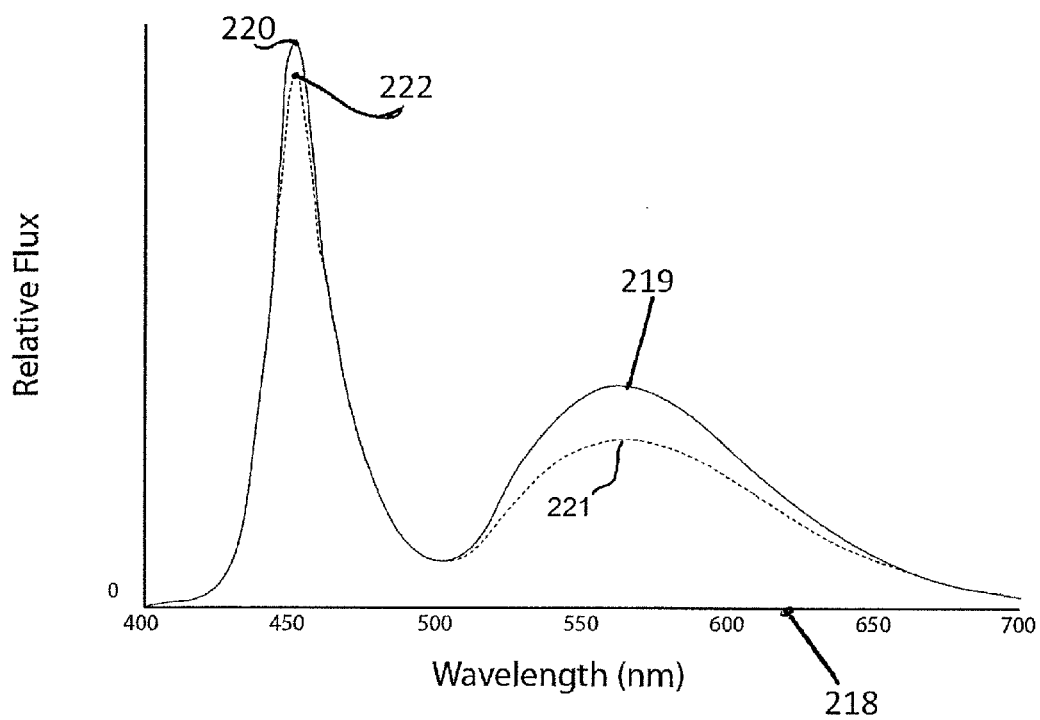
FIG. 6 depicts the relationship between the excitation and emission spectrum of the exemplary lighting elements, showing the spectrum at initial conditions and at 50,000 hours.

In the case of degradation due to operating time, the relationship between the excitation and emission spectrum is described by FIG. 6. The spectral characteristics of a lighting element at zero operation hours, or an initial condition, is represented as a solid line 219 on a wavelength scale 218. The spectral characteristics of a lighting element at 50,000 operating hours is represented as a dashed, discontinuous line 221 on the same wavelength scale 218.

In an initial condition where lighting elements are at an operating lifetime of 0 hours, the excitation intensity is at a higher level 220 than the excitation intensity in a degraded state, 222. Similarly, the broad band converted light goes from an initial high intensity 219 to a lower intensity in a degraded state 221.

Figures 7, 8:
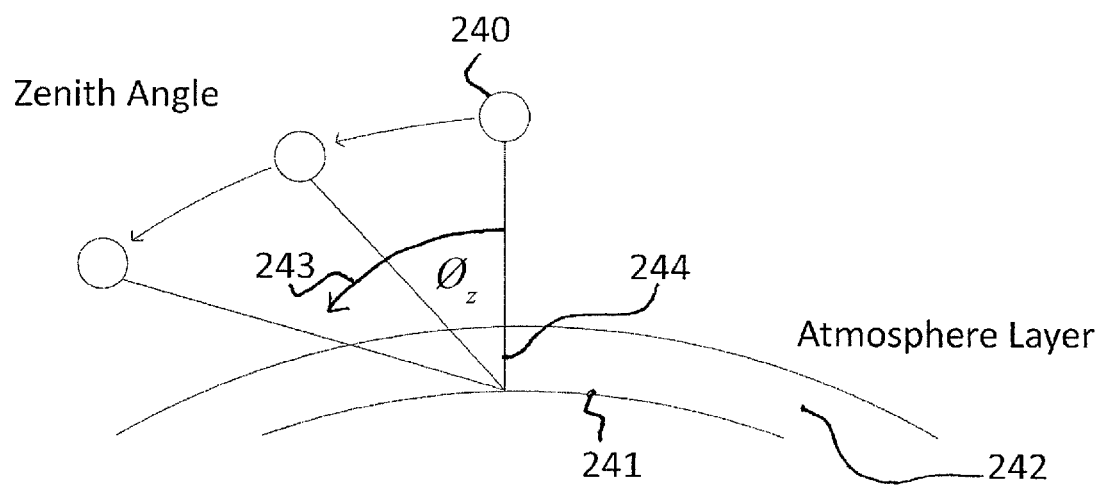
FIG. 7 depicts the angular relationship between the sun and the earth, as well as the corresponding change of path length traveled by lightwaves through the atmosphere layer.
FIG. 8 is an equation relating air mass to the zenith angle, $\phi_z$.

FIG. 7 describes the angular relationship between the sun 240 and the earth 241, along with the corresponding change of path length 244 traveled through the atmosphere layer 242. As the sun's angle, here in referred to as zenith angle, $\phi_z$, 243 changes with respect to a fixed point on the earth's surface 241, the path length 244, herein referred to as air mass, of the light through the atmosphere layer changes. The boundaries of the zenith angle 243 correspond to the horizons observed from the ground, and are −90° and +90°. This path length is commonly measured in the unit of air masses. For example, a zenith angle 243 of 0° between the sun and earth's surface corresponds to an air mass of 1.0, while a zenith angle 243 of 90° corresponds to an air mass of 38.

FIG. 8 is an expression which relates air mass 245 to any given zenith angle 246 of the sun. This zenith angle 246 can further be related to the geographic location on the earth's surface, the time of day, and the date.

Figure 9:
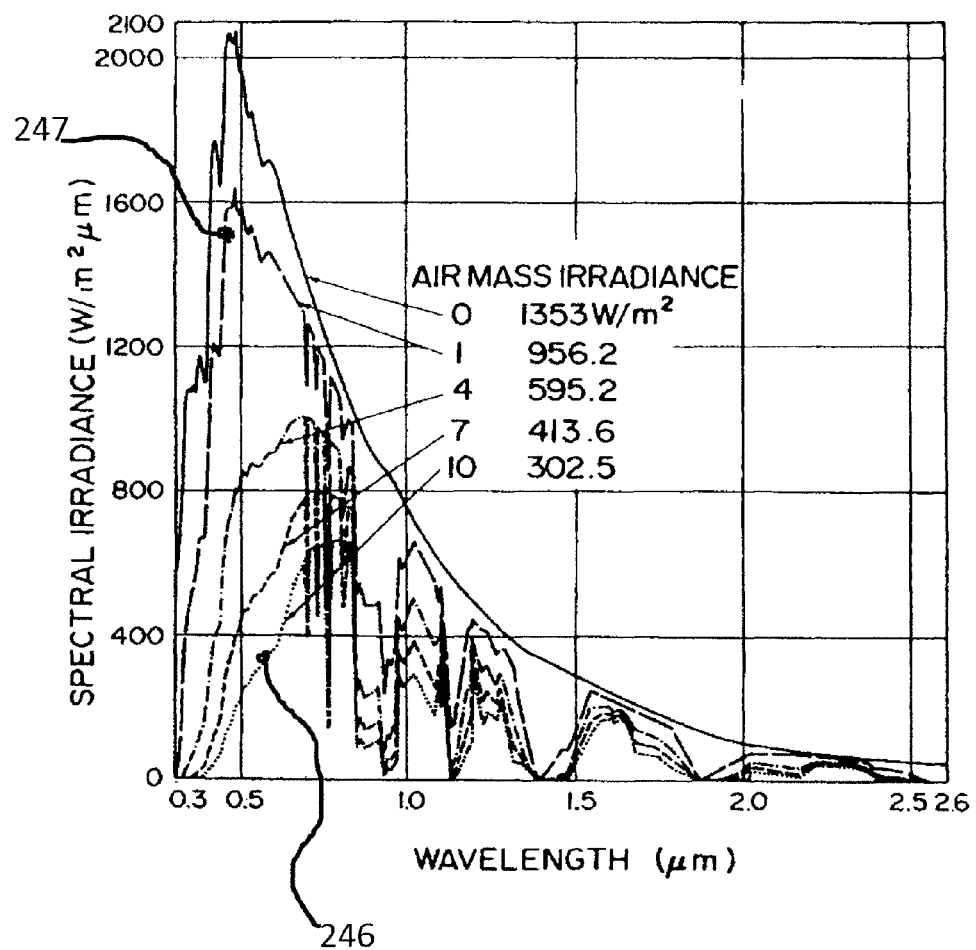
FIG. 9 depicts the changes in the spectral distribution of sunlight with air mass.

FIG. 9 describes the changes in the spectral distribution of sunlight with air mass. It is shown that for a high air mass 246 of 10, a significant decrease in wavelengths 450-600 is present relative to an air mass 247 of 1, as well as a decrease in total irradiance relative to an air mass 247 of 1.

Figure 10:
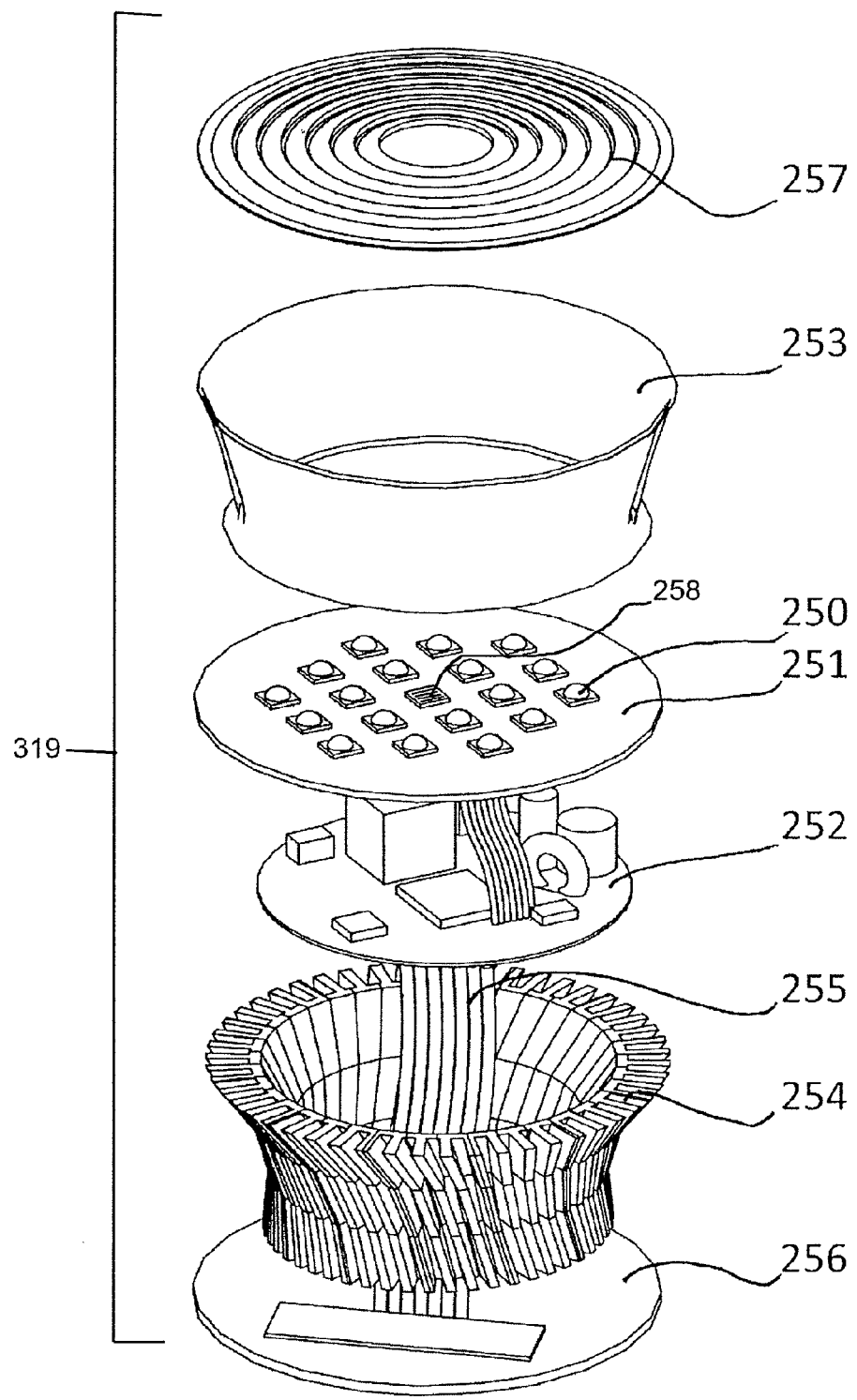
FIG. 10 is an exploded view of an exemplary lighting element of the present invention.
Figure 11:
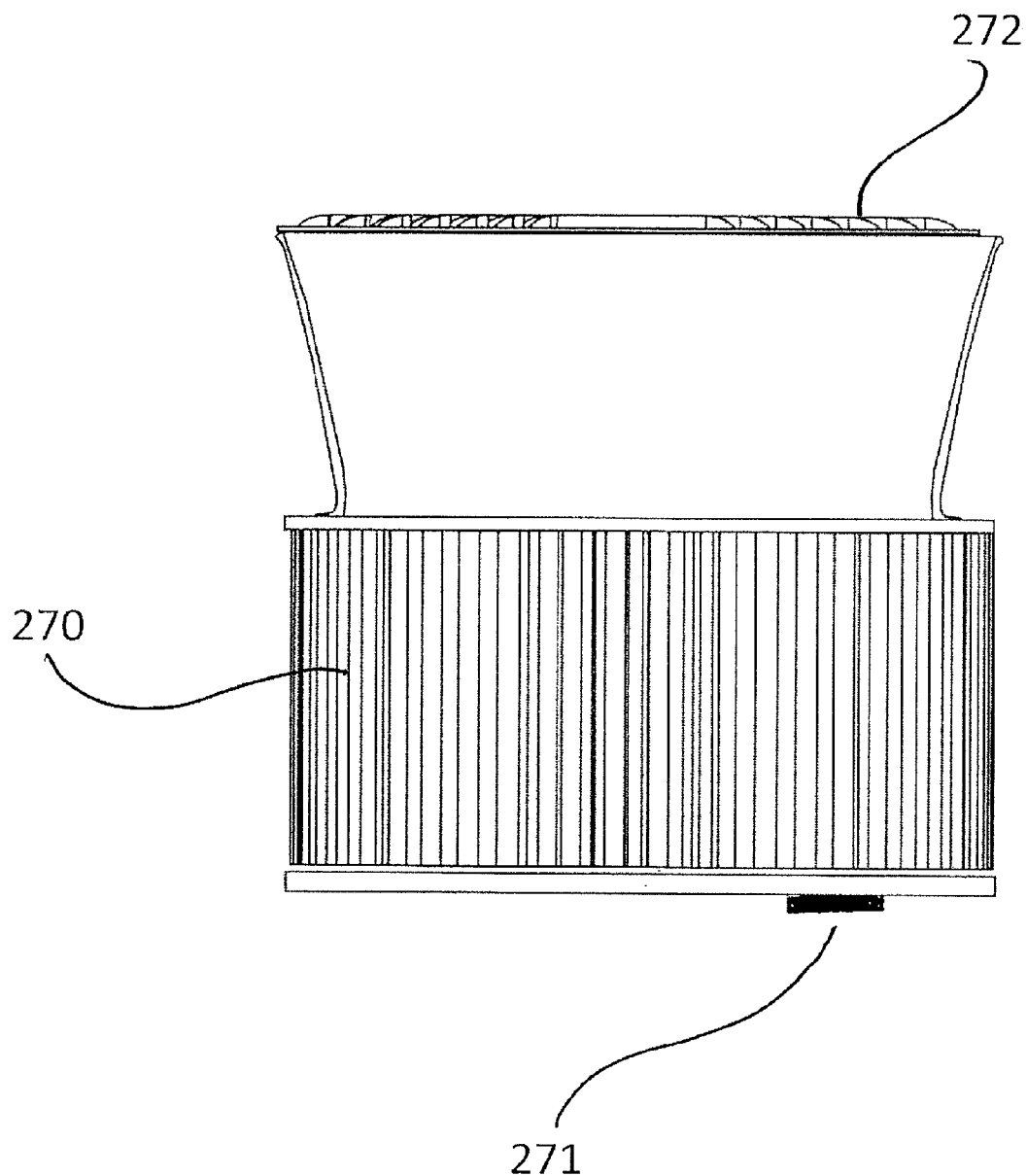
FIG. 11 is a side view of the lighting element of FIG. 10.

FIG. 10 provides an exemplary lighting fixture 319 of the present invention. The lighting fixture 319 comprises solid state lighting elements 250, thermal dissipation components 251, logic and power conversion components 252, reflector 253 and optical components 257, spectrally unique sensors 258, heat sink or heat pipe 254, internal interconnects 255, and other structural housing features 256. Where, components are assembled together into unified device consisting of a fixture body 270, power interconnect 271, and optical aperture emitting illumination 272 illustrated in FIG. 11. In this embodiment, the components are assembled into a round compact fixture suitable for providing targeted light, recessing into a ceiling, or replacing a common recessed flood light. By way of example only, the sensors 258 may be formed on a single wafer or cell as shown in FIG. 10.

Figure 12:
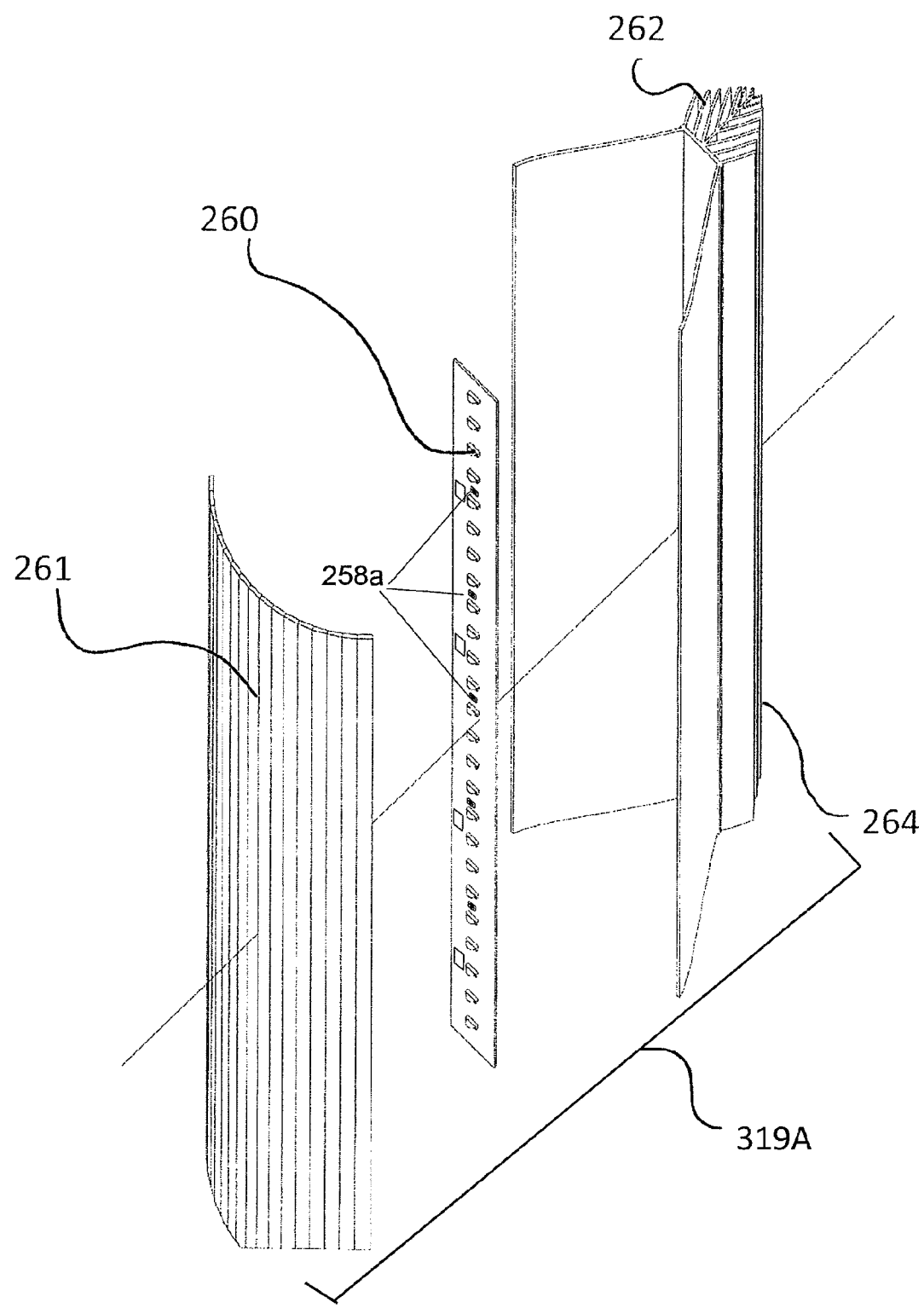
FIG. 12 is an exploded view of an alternative lighting element of the present invention.

Similarly, these key components may be arranged in an alternate fashion. Another such lighting fixture embodiment 319A is represented in FIG. 12, where lighting elements 260, optical components 261, heat sink 262 and thermal dissipation components 263, and a housing 264 are arranged in an alternate form. In this embodiment 319A, this alternate form is a linear fixture, suitable for lighting larger areas using a single fixture. Furthermore, in this configuration, the sensors 258a are distributed, as shown in FIG. 12.

In lighting fixtures 319/319A containing a plurality of lighting elements 250/250A, two elements possessing unique spectral characteristics can be placed in close proximity where the light emitted travels into a cavity and is reflected off of one or more surfaces, mixing the light.

Figure 13A:
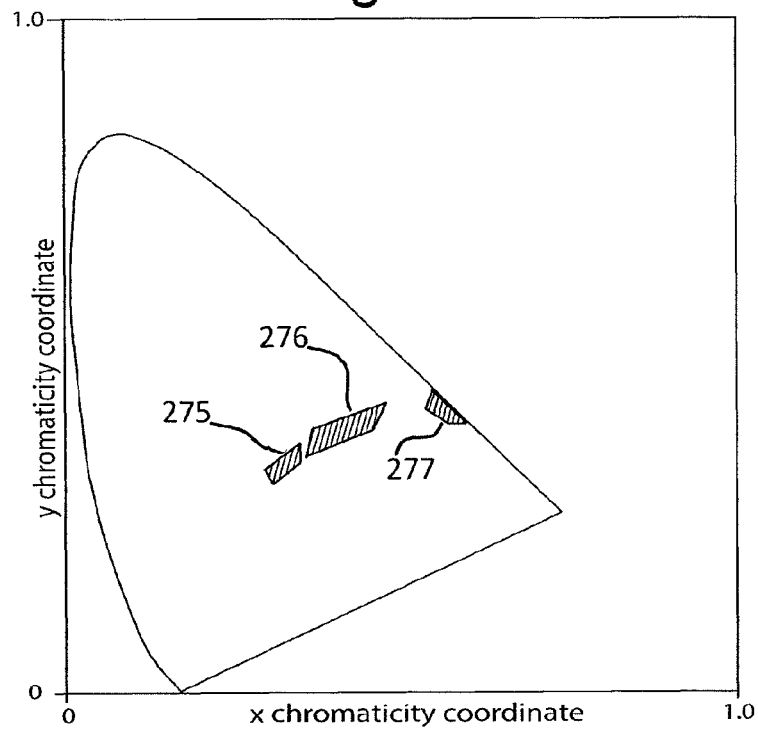
FIG. 13A depicts three exemplary boundary boxes of lighting elements that can be used in the present invention to generate a color space.
Figure 13B:
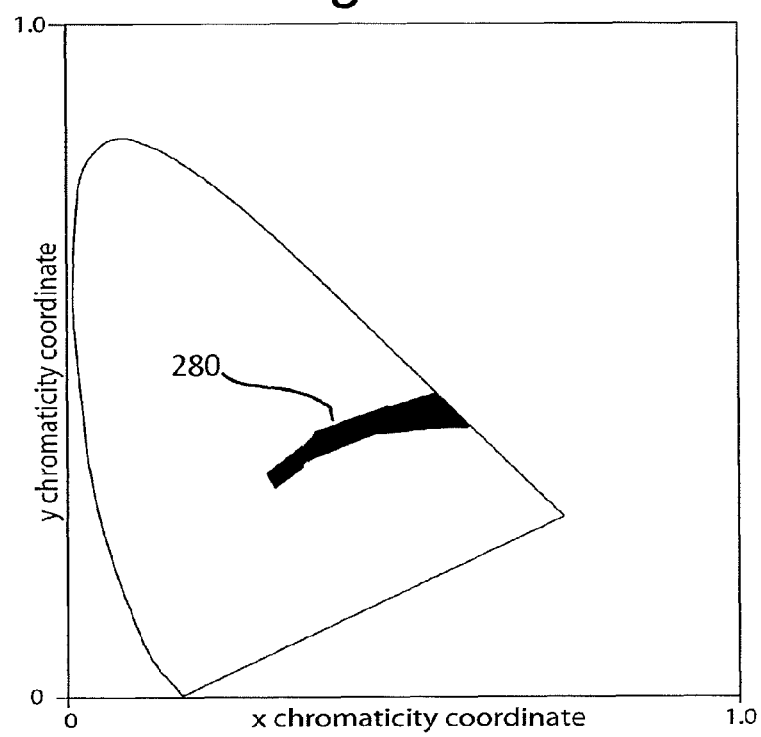
FIG. 13B depicts an exemplary color space that can be generated using the three exemplary boundary boxes of lighting elements of FIG. 13A.

FIG. 13A shows three exemplary bounding boxes 275, 276 and 277 whose lighting elements have unique spectral distributions and which, when mixed properly in the present invention, combine to generate a color space, e.g., color space 280 shown in FIG. 13B. By way of example only, the present invention may comprise three channels of lighting elements defined as follows:

Channel 1 (cool white) comprising bounding box on x,y chromaticity diagram with four points given by (x,y). lighting elements comprising channel 1 possess chromaticity characteristics falling within the bounding box 275:
  Point one having x,y chromaticity coordinates of 0.30, 0.33;
  Point two having x,y chromaticity coordinates of 0.35, 0.37;
  Point three having x,y chromaticity coordinates of 0.35, 0.34; and
  Point four having x,y chromaticity coordinates of 0.31, 0.31.

Channel 2 (warm white) comprising bounding box on x,y chromaticity diagram with four points given by (x,y). lighting elements comprising channel 2 possess chromaticity characteristics falling within the bounding box 276:
  Point one having x,y chromaticity coordinates of 0.37, 0.39;
  Point two having x,y chromaticity coordinates of 0.48, 0.43;
  Point three having x,y chromaticity coordinates of 0.46, 0.39; and
  Point four having x,y chromaticity coordinates of 0.36, 0.35.

Channel 3 (amber) 277: comprising bounding box on x,y chromaticity diagram with four points given by (x,y). lighting elements comprising channel 3 possess chromaticity characteristics falling within the bounding box
  Point one having x,y chromaticity coordinates of 0.54, 0.42;
  Point two having x,y chromaticity coordinates of 0.55, 0.45;
  Point three having x,y chromaticity coordinates of 0.60, 0.40; and
  Point four having x,y chromaticity coordinates of 0.57, 0.40.

Figure 14A:
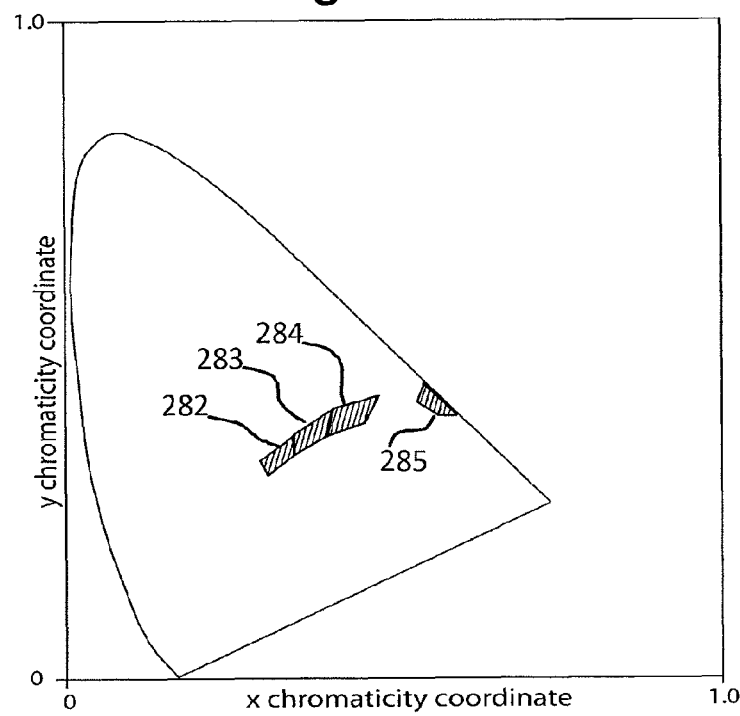
FIG. 14A depicts four exemplary boundary boxes of lighting elements that can be used in the present invention to generate another color space.
Figure 14B:
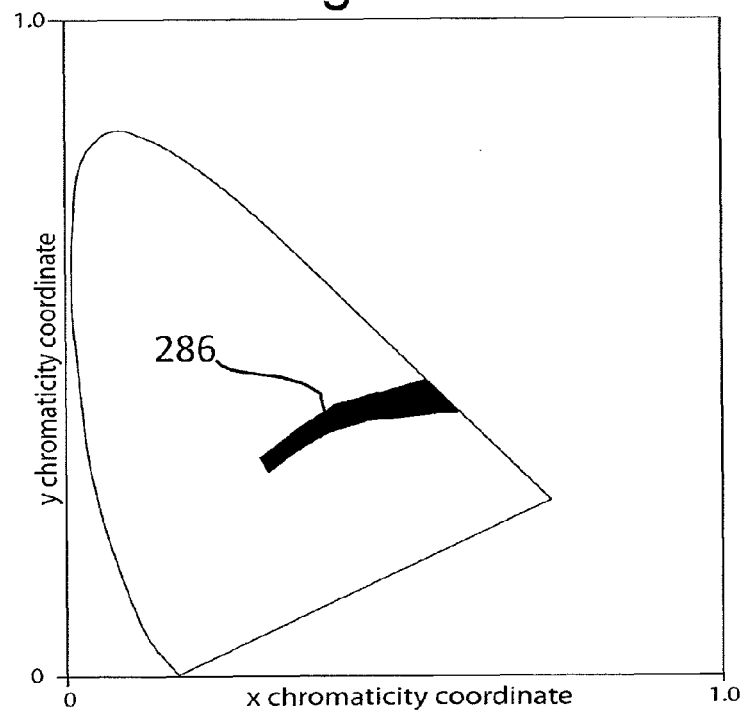
FIG. 14B depicts an exemplary color space that can be generated using the four exemplary boundary boxes of lighting elements of FIG. 14A.

FIG. 14A shows four exemplary bounding boxes 282, 283, 284 and 285 whose lighting elements have unique spectral distributions and which, when mixed properly in the present invention, combine to generate a color space, e.g., color space 286 shown in FIG. 14B. By way of example only, the present invention may comprise four channels of lighting elements defined as follows:

Channel 1 (very cool white) comprising bounding box on x,y chromaticity diagram with four points given by (x,y). LED emitters comprising channel one possess chromaticity characteristics falling within the bounding box 282:
  Point one having x,y chromaticity coordinates of 0.30, 0.33;
  Point two having x,y chromaticity coordinates of 0.35, 0.37;
  Point three having x,y chromaticity coordinates of 0.35, 0.34; and
  Point four having x,y chromaticity coordinates of 0.31, 0.31.

Channel 2 (neutral) comprising bounding box on x,y chromaticity diagram with four points given by (x,y). lighting elements comprising channel one possess chromaticity characteristics falling within the bounding box 283:
  Point one having x,y chromaticity coordinates of 0.35, 0.37;
  Point two having x,y chromaticity coordinates of 0.41, 0.41;
  Point three having x,y chromaticity coordinates of 0.40, 0.37; and
  Point four having x,y chromaticity coordinates of 0.35, 0.34.

Channel 3 (warm white) comprising bounding box on x,y chromaticity diagram with four points given by (x,y). lighting elements comprising channel one possess chromaticity characteristics falling within the bounding box 284:
  Point one having x,y chromaticity coordinates of 0.41, 0.41;
  Point two having x,y chromaticity coordinates of 0.48, 0.43;
  Point three having x,y chromaticity coordinates of 0.46, 0.39; and
  Point four having x,y chromaticity coordinates of 0.40, 0.37.

Channel 4 (amber) comprising bounding box on x,y chromaticity diagram with four points given by (x,y). lighting elements comprising channel one possess chromaticity characteristics falling within the bounding box 285:
  Point one having x,y chromaticity coordinates of 0.54, 0.42;
  Point two having x,y chromaticity coordinates of 0.55, 0.45;
  Point three having x,y chromaticity coordinates of 0.60, 0.40; and
  Point four having x,y chromaticity coordinates of 0.57, 0.40.

As mentioned previously, one of the unique aspects of the present invention is the ability to control lighting devices, and more specifically, (as will be discussed in detail below), controlling the brightness levels and the color levels of a plurality of lighting element channels. And as also mentioned earlier, this control is effected by permitting inputs to be made (either manually or automatically):
  1) dimming level;
  2) dimming level and color temperature level;
  3) time of day;
  4) time zone;
  5) geographic location;
  6) desired circadian response;
  7) present activity (e.g., sleep, reading, working, studying, eating, resting, etc.); and
  8) angle of sun.

A ninth input is the flux of color light, i.e., being able to control the total flux of a specific color light from a relative level of 1-100% the maximum color flux of the lighting fixture through control of each individual lighting element.

This is especially important for the flux of blue light (viz., 464 nm). It should be noted that a lighting system with a shorter range of 3500-5000K for example can still satisfy the requirements to coordinate circadian rhythms by regulating output of blue light (specifically the flux of 464 nm light). It is within the scope of the invention that a lighting device comprising at least three lighting elements of characteristic chromaticity illustrated in FIGS. 13A-14B may be limited to the range of 3000-6000K for example based on the balance of lighting elements in the fixture. Furthermore, a lighting device comprising at least three lighting elements of the characteristic chromaticity illustrated in FIGS. 13A-14B where each lighting device outputs at any flux level is within the scope of the present invention.

In one example, the circadian rhythm of a subject is regulated or affected by artificial light where the flux of blue light (specifically 464 nm) is adjusted through changes in color temperature, brightness, or both. This example teaches that even warm white light contains a quantity of blue light which can influence a circadian response, and that light of a constant color temperature can be modulated in intensity to induce a circadian response.

The present invention implements a prescriptive control of the blue light component of the overall white light emission. By way of example only, a combination of at least three lighting fixtures can be controlled whereby the total flux of blue light can be adjusted from a relative level of 1-100% the maximum blue flux of the lighting device through control of each individual lighting element. Therefore, for example, where three lighting fixtures emit white light at 20 lux, 200 lux and 2000 lux, respectively, the blue light component for each fixture can be controlled at a 25% relative level, namely, 5 lux, 50 lux and 500 lux, respectively.

Figure 15:
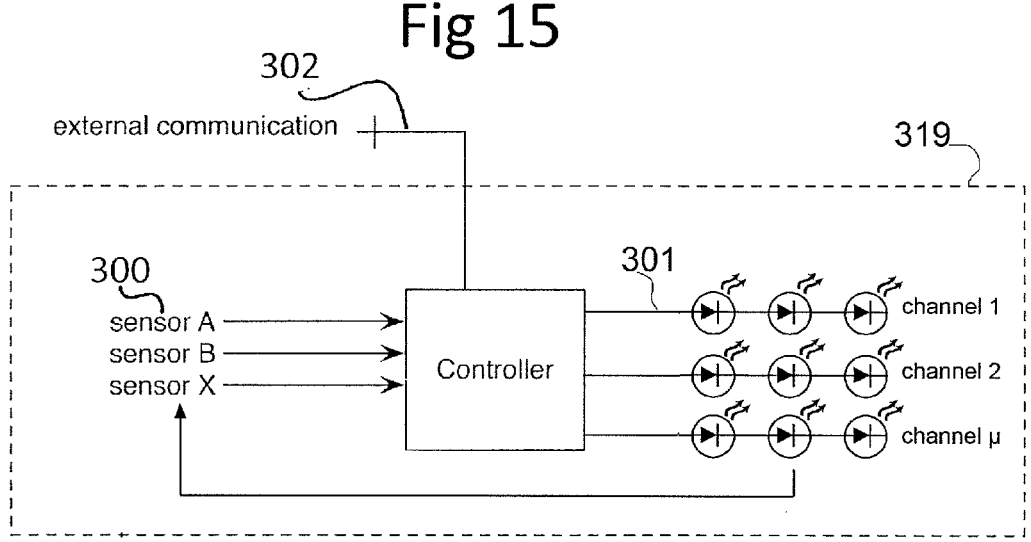
FIG. 15 comprises a block diagram of a portion of the system of the present invention wherein a controller receives optical sensor outputs for controlling lighting element operation.

As shown in FIG. 15, a controller 299 executes operations within a fixture 319 by employing a closed loop feedback mechanism incorporating at least two spectrally unique sensors 300 and at least one lighting element 250/260 using at least three channels 301. Means of external input 302 allows for the fixture to be dimmed or for its color conditions to be changed by applying a modulated duty cycle or by applying a pulse width modulation (PWM) signal to the channels or groups of lighting elements. In the case of high power LEDs suited for general illumination, other components 303 such as amplifiers or drivers are necessary to amplify the PWM signals produced by the controller, however for illustration purposes, these components will be summarized as above. Elements enclosed by the dashed line 319 are components within a single fixture.

Figure 16:
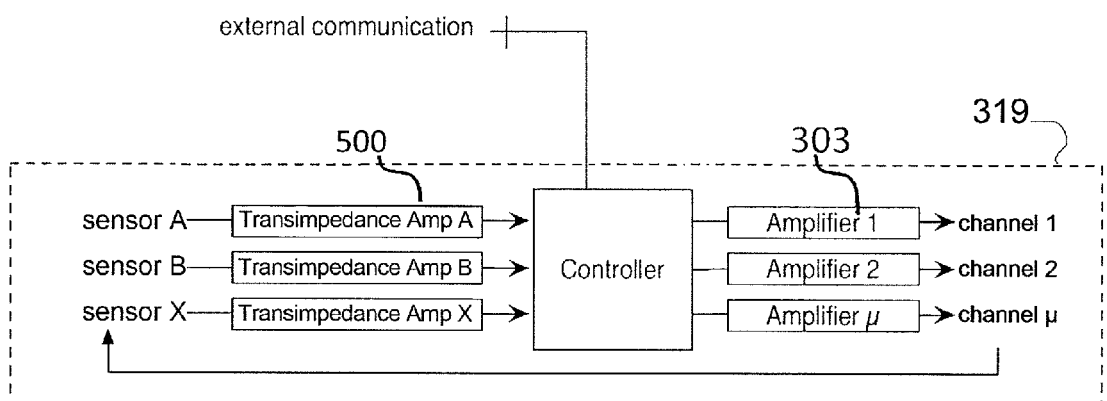
FIG. 16 comprises a block diagram of the system of FIG. 15 but including amplifier stages prior to the lighting elements.
Figure 17:
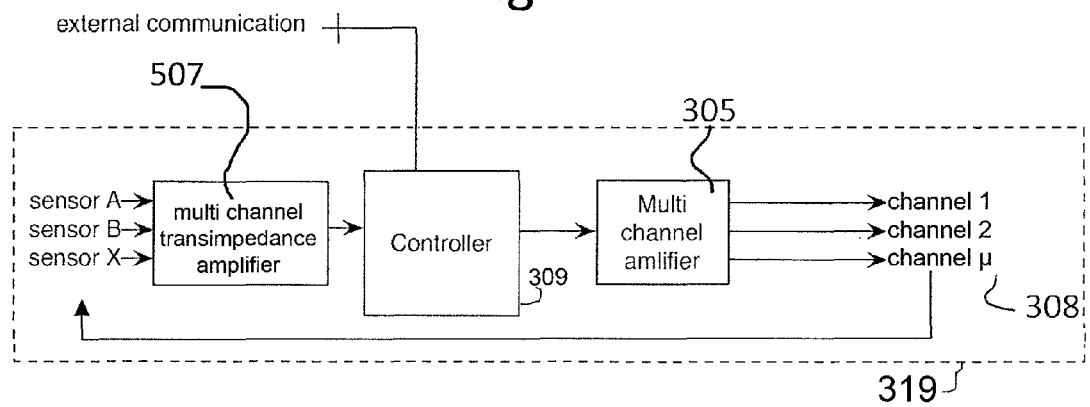
FIG. 17 depicts the consolidation of the lighting elements into one or more devices, such as multi-channel amplifiers or multi-channel drivers.

Similarly, the lighting elements 308 can be grouped or consolidated into one or more devices 305 such as a multi channel amplifier, multi channel driver, or other controller coupled with an analog to digital converter circuit before coupling with the controller 309. To those known in the art, it is apparent that there are several ways of multiplexing these channels, and illustrated within are a few common examples. In particular, FIG. 16 shows the configuration of FIG. 15 using dedicated amplifiers 303 for the three channels 301. Alternatively, a multi-channel amplifier 305 can be used as shown in FIG. 17.

Figure 18:
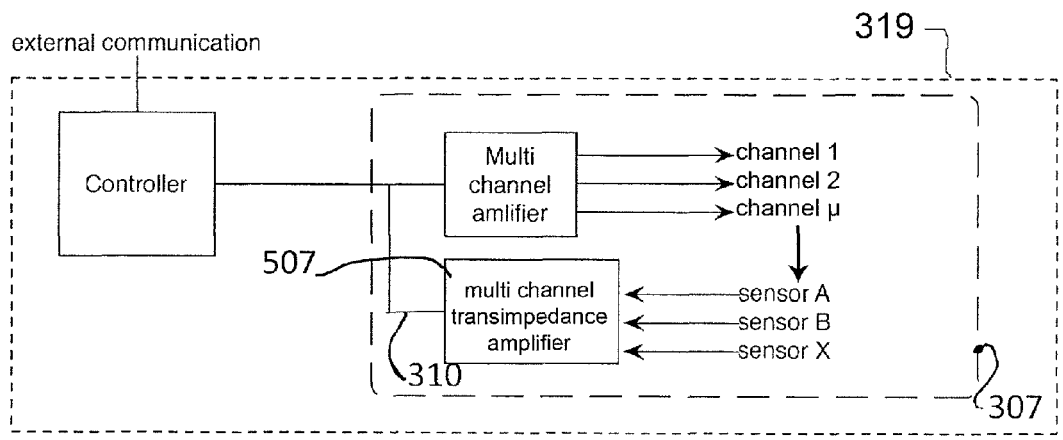
FIG. 18 depicts multiplexed devices, such as lighting elements, sensors, amplifiers, as well as other devices combined on a common digital bus.

As shown in FIG. 18, multiplexed devices such as lighting elements, sensors, amplifiers, and other devices may be combined on a common digital bus 310 as a means of interconnecting with a central controller using a variety of analog to digital converters, drivers, or controllers. A collection of sensors and lighting elements within close proximity can form an array 307 or individual closed loop when the said devices are connected to a common bus. The analog to digital converter circuit in FIG. 18 may comprise a microcontroller device capable of accepting a plurality of analog inputs and combining them on a common connection such as a digital interface, an I2C interface, or a serial interface.

Figure 19:
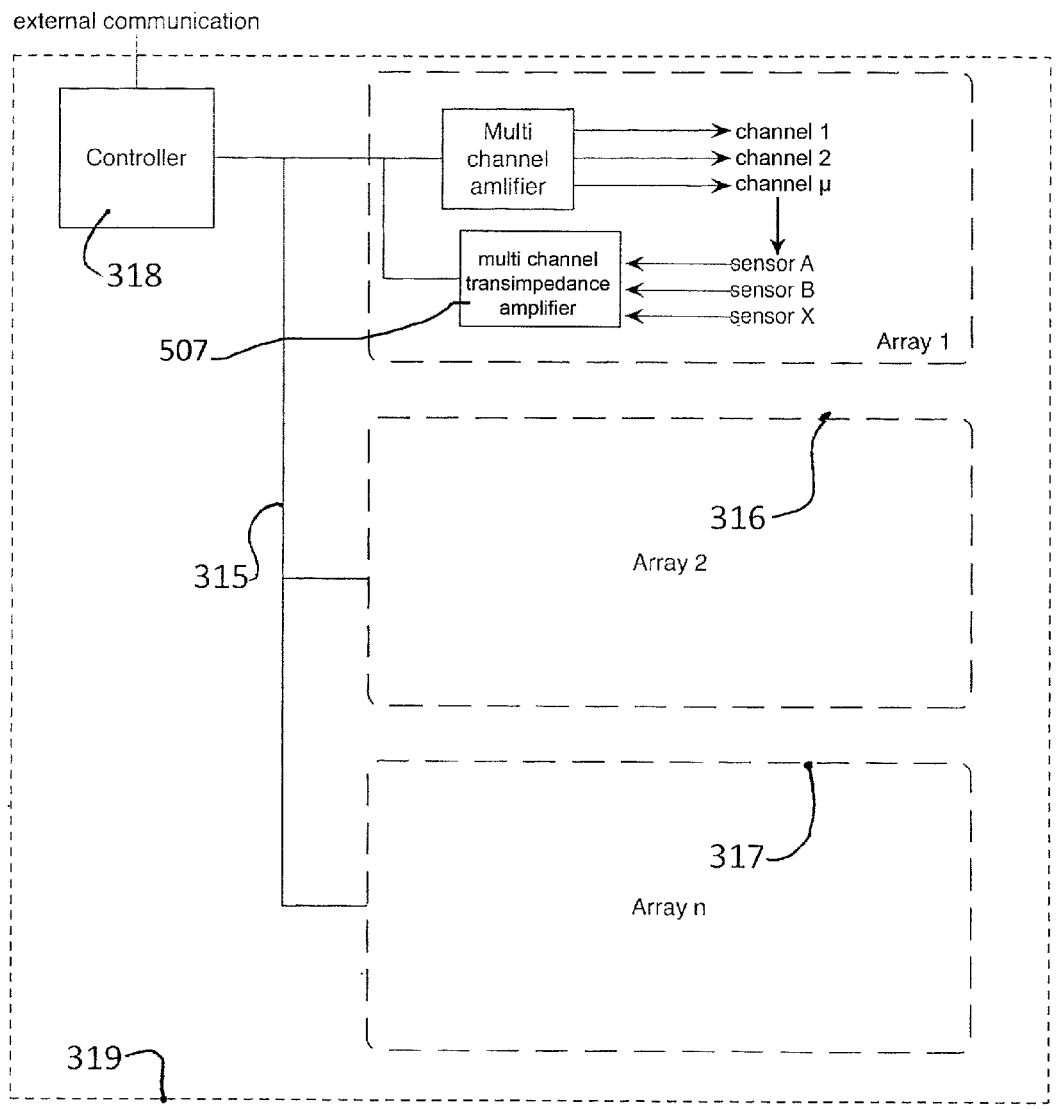
FIG. 19 shows the use of multiple arrays or collections of devices within common spatial regions which are combined on a common digital bus.

For some types of optical sensors such as photodiodes, a transimpedance amplifier may be necessary to convert current to voltage for the controller to process feedback data. FIG. 16 depicts sensors connected to singular transimpedance amps 500 which consist of a single current input and a single voltage output. FIGS. 17, 18, & 19 depict sensors which are connected to a multi-channel transimpedance amplifier 507 which accepts multiple current inputs from sensors and outputs multiple voltages to the controller. To those skilled in the art, it is apparent that this multi-channel transimpedance amplifier can be combined with or interfaced to an analog to digital converter to combine a plurality of voltage signals to a single digital interface such as I2C. This arrangement has not been explicitly illustrated.

FIG. 19 shows that multiple arrays or collections of devices within common spatial regions can be combined on a common digital bus 315 and controller 318, forming multiple closed feedback loops 316, 317 within a singular fixture represented by a bounding dashed line 319 (or 319A).

Figure 20:
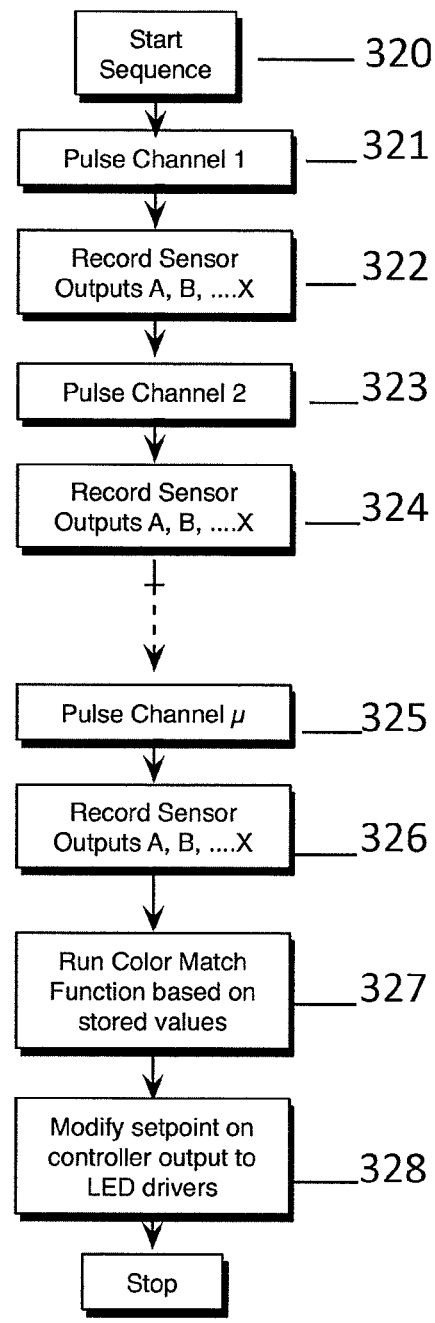
FIG. 20 is flow diagram of the sensor activation sequence.

FIG. 20 shows the sensor activation sequence. Following the initialization step 320, channels 1, 2, and 3 are activated during steps 321, 323, 325, respectively, in sequence and the corresponding sensor data are recorded during recordation steps 322, 324 and 326. From data gathered, the color match function is executed at step 327 and the result is sent to the controller at step 328 to accurately operate the fixture at the correct color. Basically, the color match function (CMF) involves driving the lighting elements to the calibration point of the sensors. This can be achieved in various ways from manual changes to automated methods or a combination of both.

As mentioned previously, three unique spectral sensors (A, B and X) are in close proximity to the at least three channels 301 comprising a plurality of lighting elements (250). However, it should be understood that the number of sensors is not limited to three (hence, the sequence, A, B and X, with indicating an infinite number of sensors). In fact, it is within the broadest scope of the invention to include at least two sensors. Similarly, it should be understood that the number of channels is not limited to three (hence the sequence of 1, 2, $\mu$). In fact, it is within the broadest scope of the invention to include at least three channels.

In this embodiment, a first group or channel of lighting elements is activated 330, illustrated by the FIG. 21 output chart with time on the x axis 331 and amplitude on the y axis 332. At this time, a corresponding set of inputs from the sensors is recorded, illustrated by voltages 333, 334, and 335 on the input chart in FIG. 23. A second group or channel of lighting elements is then activated 336 and another set of inputs 337 are recorded from the sensors. This process continues until all X channels are activated.

FIG. 23 illustrates the data available to the fixture upon completion of the calibration sequence described by FIGS. 22-23. Columns 341, 342, 343, and 344, represent the data obtained from the short interval in which a single lighting element or collection of common elements is illuminated at the start up sequence. Column 344 represents values corresponding to the unique inputs obtained from the sensors after applying a balanced duty cycle to each lighting element, or illuminating each element to balanced intensities. Values 345 are the initial condition (lifetime=0 hours) balanced duty cycle voltages obtained from the sensors with a new lighting element or elements. This illustrated data is used by the controller and algorithms to illuminate a collection of lighting elements where the additive output corresponds to pre determined conditions.

Figure 24:
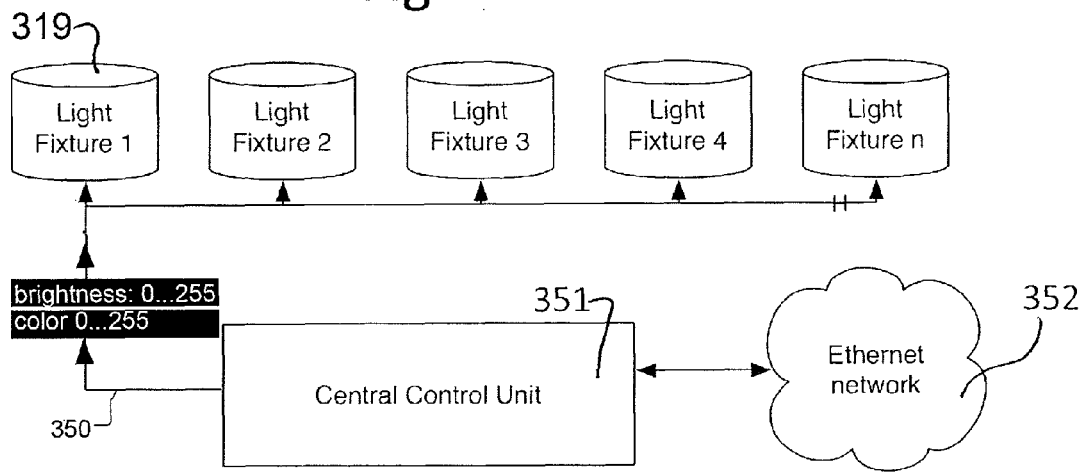
FIG. 24 is a block diagram of a light fixture control system of the present invention using a non-serial network (e.g., Ethernet)

As shown in FIG. 24, a serially linked digital network 350 (e.g., RS-485 or RS-232) may be used to control lighting elements 353 and a central control unit 351. This network can establish a strictly one way or two way communication between devices. In this embodiment, a typical lighting control network interfaces with another non-serial network such as a common Ethernet network 352 for accessing advanced features, configurations, and diagnostic information. The serially linked digital network 350 may use a digital protocol such as I2C, a serial protocol such as RS-485, RS-232, or a wireless protocol such as Zigbee or other RF signals.

Figure 25:
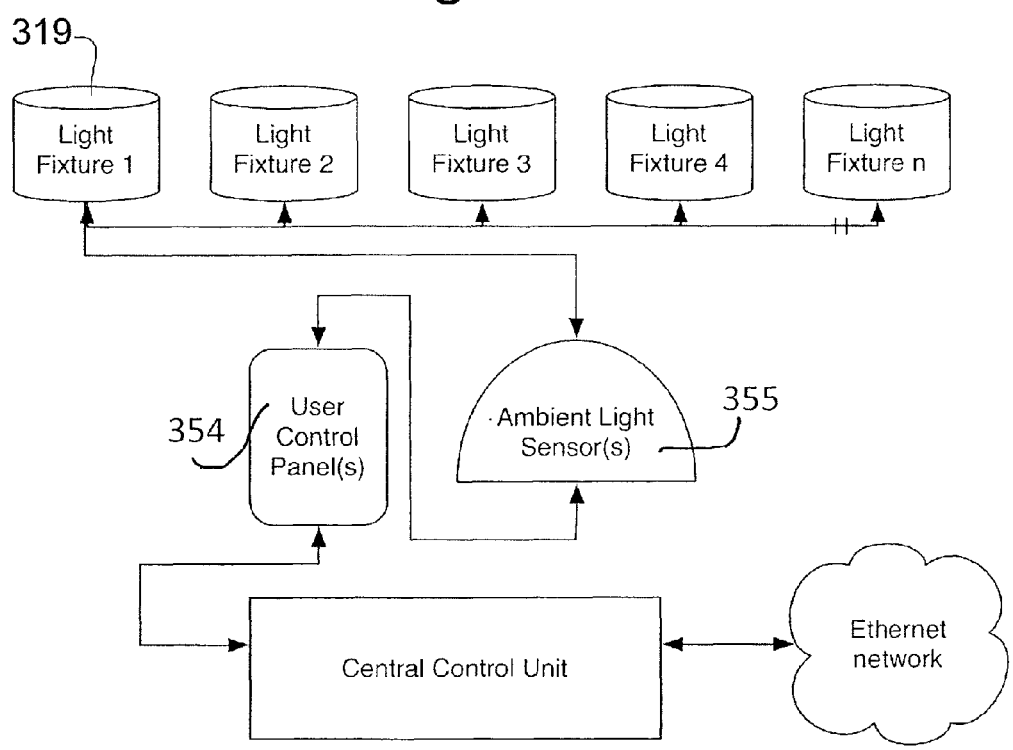
FIG. 25 is a block diagram of a light fixture control system as shown in FIG. 25 but including light sensor and user controls.

FIG. 25 shows that such control networks can also incorporate other elements common to lighting systems such as light sensors 354 and user controls 355 such as switches. These devices are identified on the network as any other device with an address and defined input and or output channels, operating on a common communication protocol.

Figure 26:
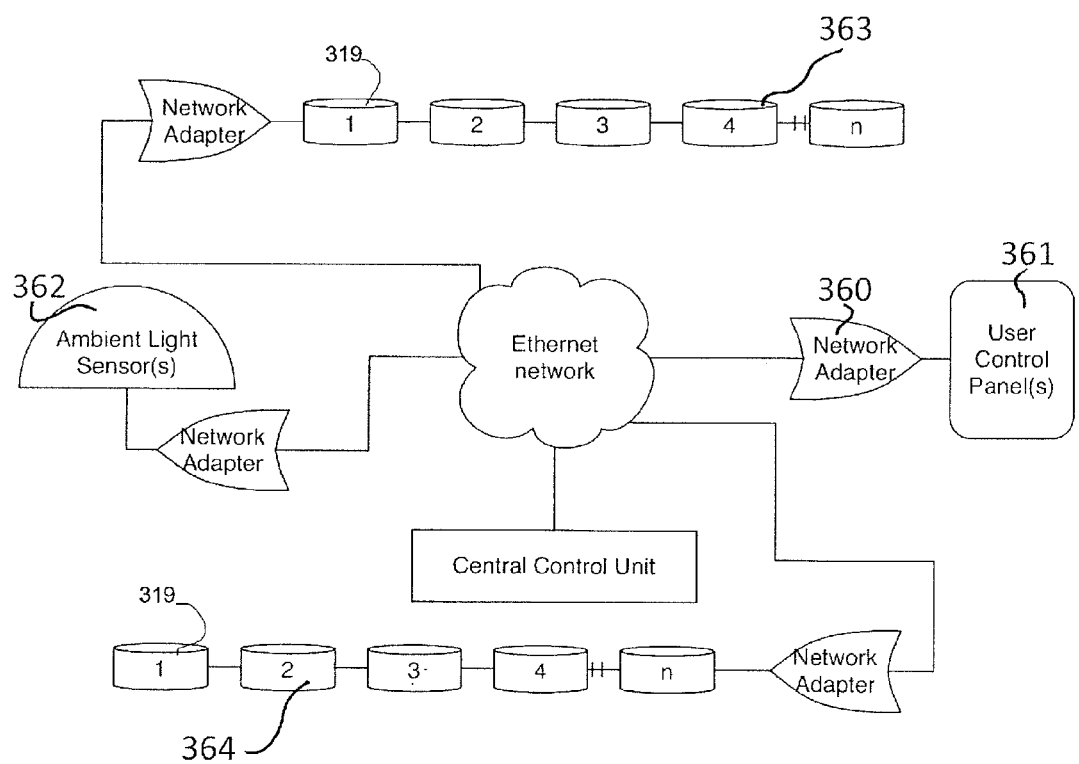
FIG. 26 is a block diagram of a light fixture control system as shown in FIG. 26 but including an extended reach via the use of network adapters.

As shown in FIG. 26, this communication protocol may be transmitted across other common networks such as Ethernet or wireless networks using network adapters 360 to extend the reach of a control network or to simplify interconnection of single devices 361, 362 or groups of devices 363, 364. In this embodiment, a wired Ethernet network is illustrated in which adapters are employed to extend the reach of devices on the control network.

Figure 27:
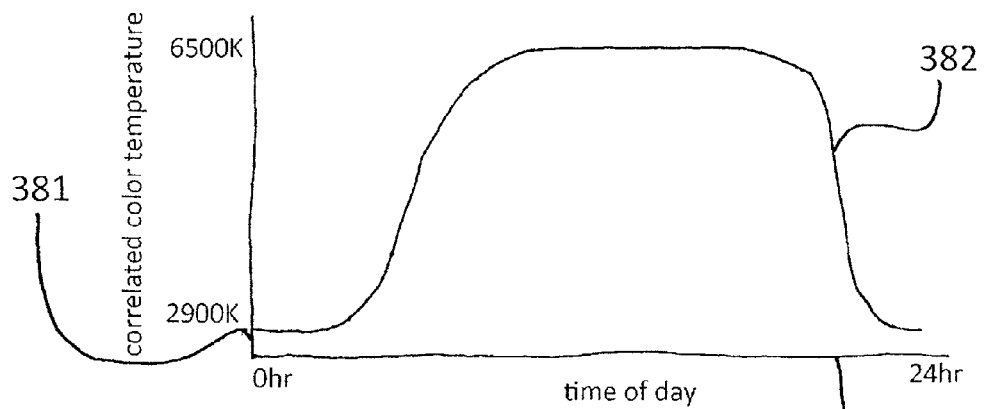
FIG. 27 is a plot of correlated color temperature vs. time of day used in the present invention for controlling one or more light fixtures.
Figure 28:
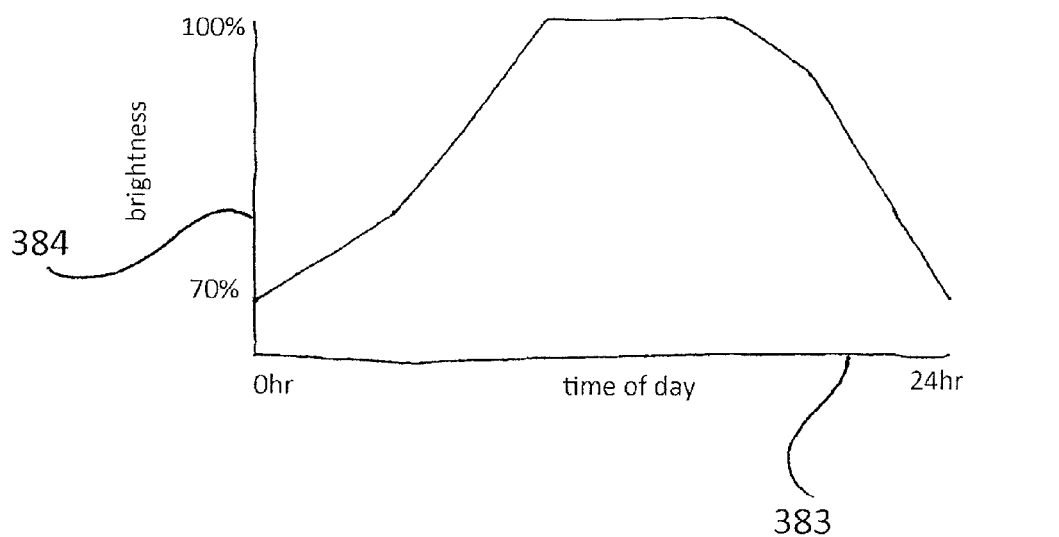
FIG. 28 is a plot showing how light fixture brightness may be altered by the present invention during a 24 hour period.
Figure 29:
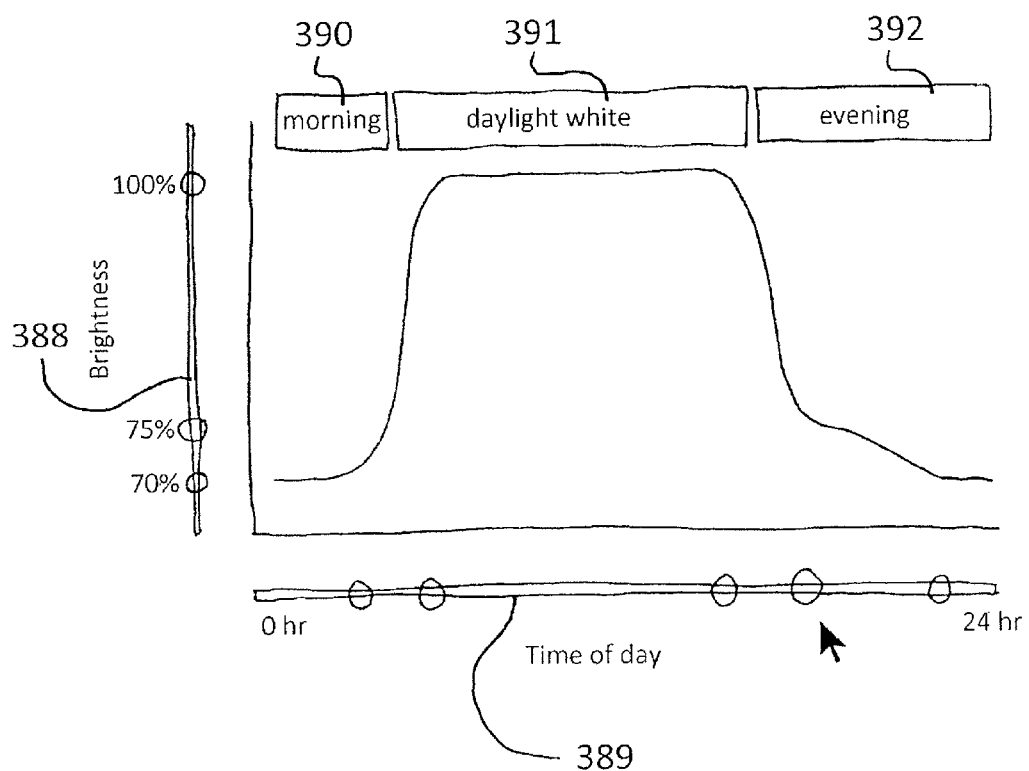
FIG. 29 is an alternative plot showing, brightness, color temperature, and time being assigned graphically using an interface consisting of sliders and zones.

With a communications network in place linking multiple lighting fixtures, several time-color profiles can be assigned to one or more of these fixtures. In one embodiment, a simple schedule described in FIG. 27 is assigned to a group of lighting fixtures, in which the horizontal x axis 380 represents the time of day from 0 to 24 hours, and the vertical y axis 381 represents the correlated color temperature in degrees Kelvin. This profile gradually varies the correlated color temperature of the lighting fixtures over a period of 24 hours, illustrated by the solid line 382. FIG. 28 describes how brightness of a fixture may be changed throughout a 24 hour period where the horizontal x axis 383 represents the time of day from 0 to 24 hours, and the vertical y axis 384 represents the perceived brightness of the fixture. The profiles described in FIGS. 28-29 may be assigned independently of one another, and only represent one embodiment of the invention. Regarding schedules (e.g., as shown in FIGS. 27-29), the time period may be variable, corresponding to a day (e.g., 24 hours), a portion of a day, defined by the lighting device as a function of input such as intensity or dimming level, or defined by an external controller as a function of input such as intensity or dimming level. In one embodiment, a dynamically changing brightness-color function is used in response to user input rather than a defined schedule. In this embodiment, the color temperature of the lighting fixtures is dynamically changed in real time in response to the user defined brightness of the fixture. The resultant behavior of this embodiment is meant to mimic the color-brightness behavior of an incandescent light bulb being dimmed.

It should be noted that the communication system:
- may comprise methods to program cues and or schedules;
- may be analog in nature and wherein changes in an input voltage denote a change in cue or lighting schedule;
- may include a digital connection comprising serialized data bits or packets coordinating fixtures;
- may comprise an external control device and tree structure or daisy chain structure;
- may comprise communication of cue changes or activation of conditions programmed into fixtures;
- may comprise communication of specific colorimetric or feedback loop data;
- may comprise a communication of pulse width modulation parameters; or
- may comprise a wireless mesh network exhibiting distributed structure or top down structure.

In another embodiment described by FIG. 29, brightness, color temperature, and time are assigned graphically using an interface consisting of sliders 388, 389 and zones 390, 391, 392. Profiles containing time dependent information on brightness and color temperature may be saved in a digital format and modified by the user.

Figure 30:
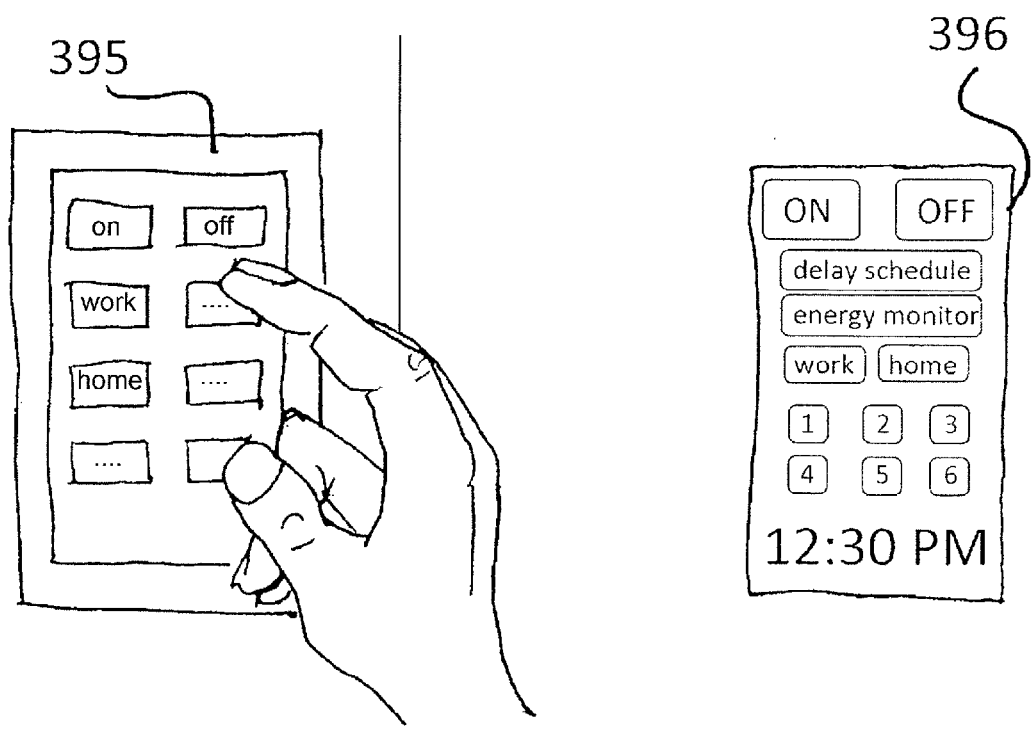
FIG. 30 depicts a user interface for controlling the system of the present invention.

Settings, profiles, preferences, and other functions such as off and on may be controlled using a push button interface installed in an interior. FIG. 30 describes one such interface 395 where the user interacts with the system using a collection of push buttons. Similarly, these push buttons may be arranged on a touch sensitive display device capable of dynamically changing to present the user with additional options 396. Interactions with the control panels described in FIG. 30 results in dynamic changes to the system which may include time, color, and brightness autonomous changes requiring no further input.

Figure 31:
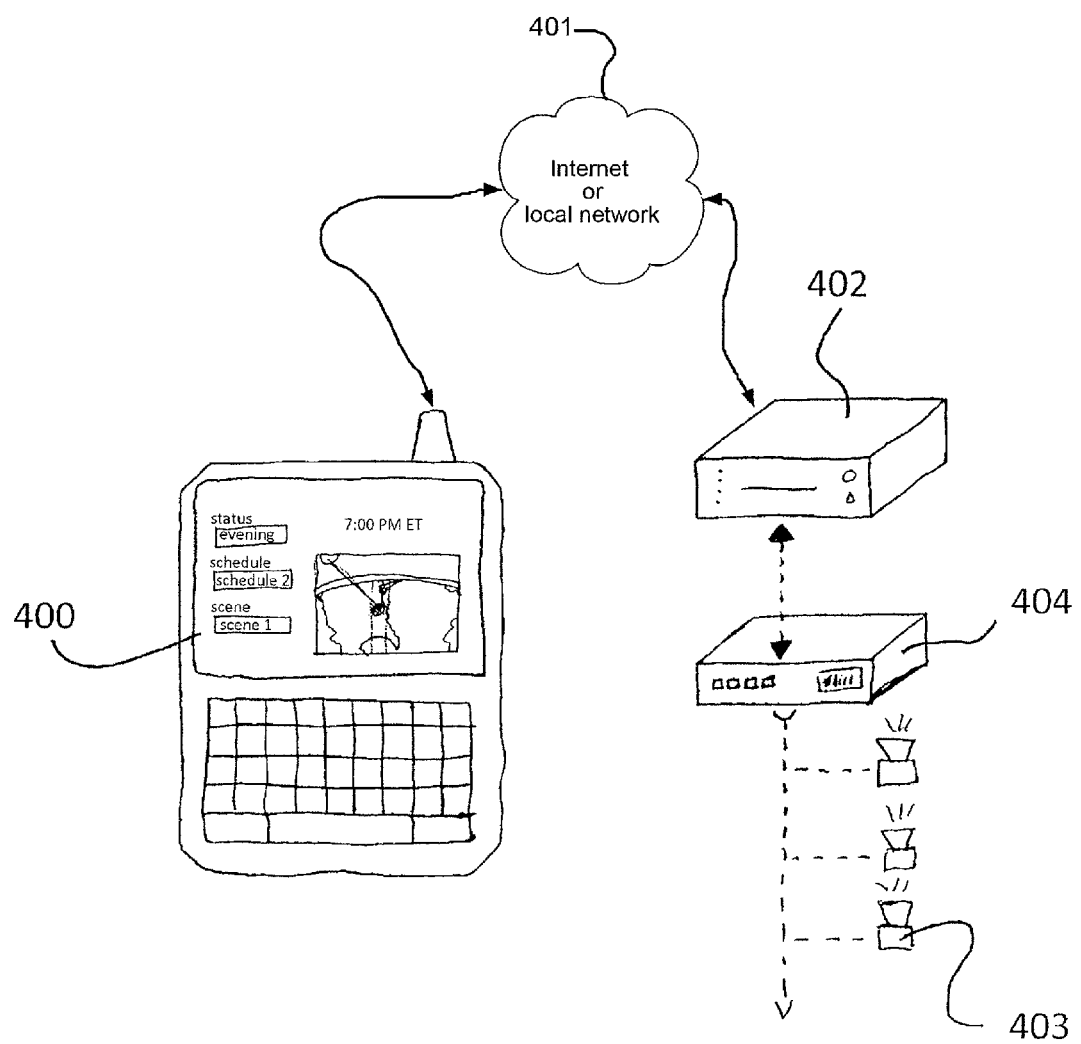
FIG. 31 shows a further variation of the system of the present invention which permits remote control of the system via a cellular phone, PDA, notebook computer, etc.

FIG. 31 describes an embodiment in which a handheld computing device such as a phone, PDA, or notebook computer 400 makes a common connection 401 with an adapter 402 in the communication network common to the lighting elements 403 and central controller 404. In this embodiment, a user is able to make changes to the lighting network affecting time dependent functions of color and brightness of the lighting fixtures.

Figure 32:
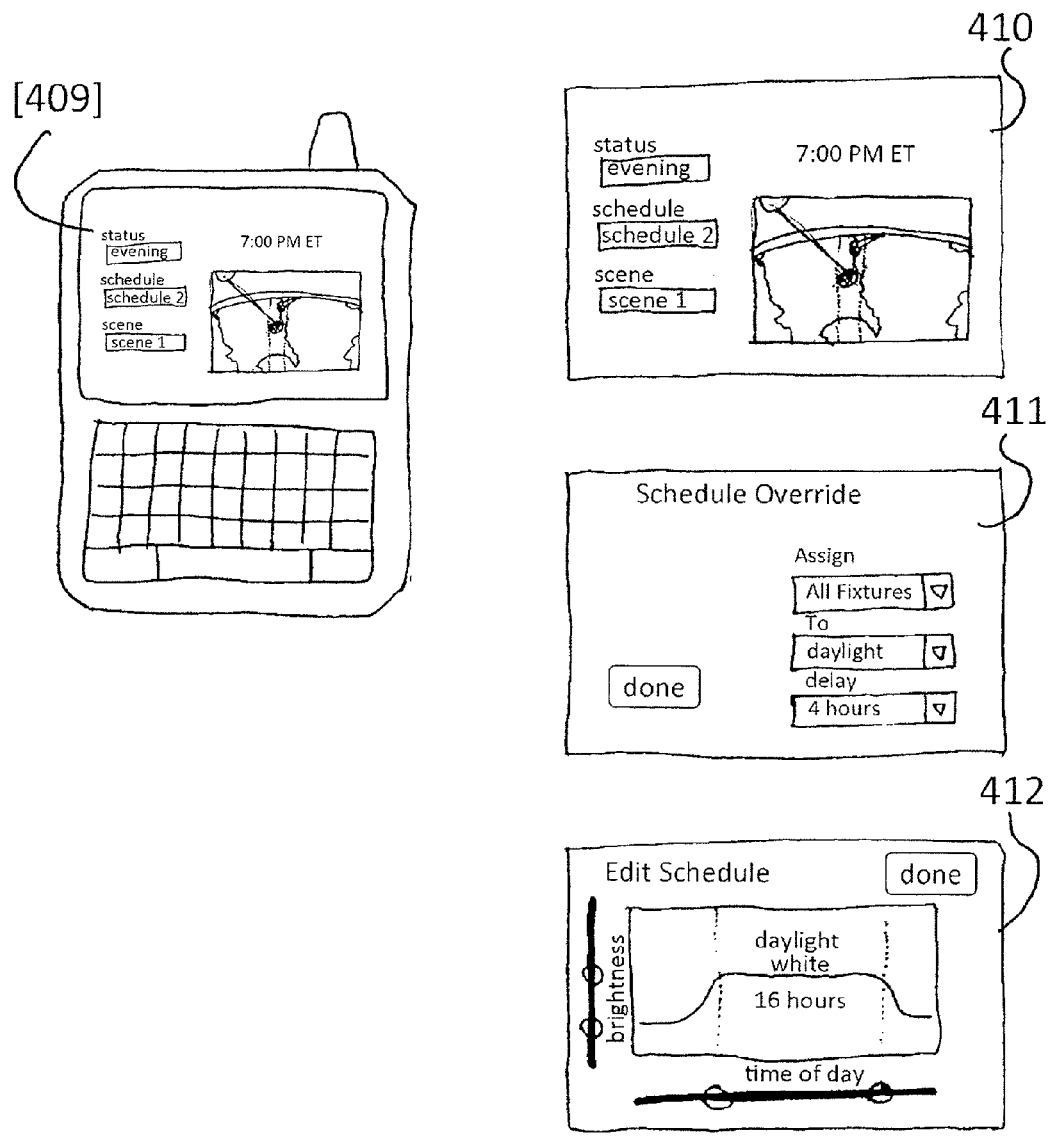
FIG. 32 shows exemplary user interface applications for use on the remote devices for controlling the system of the present invention.

FIG. 32 describes several user options available to a handheld computing device 409, where 410, 411, and 412 are three such control panels which can be displayed on the integrated display device in the handheld computing device 409. User inputs on the handheld device through control panels described in FIG. 32 can have a time dependent change on brightness and color of the lighting elements in the control network.

Figure 33:
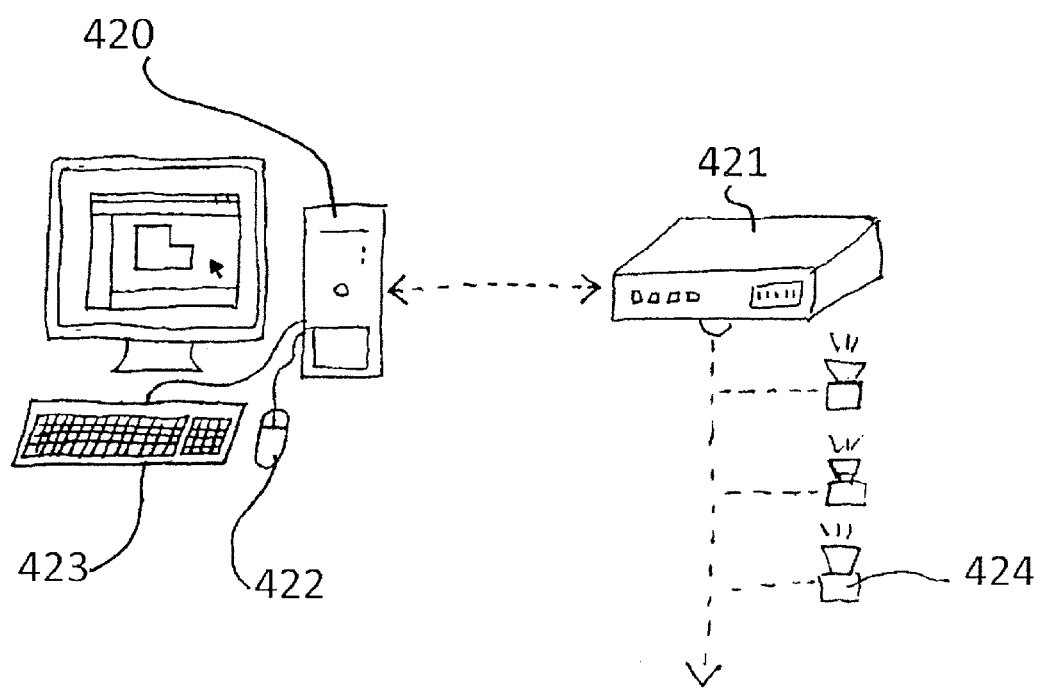
FIG. 33 is a block diagram depicting how a desktop computer can be used to interface with a lighting control network of the present invention.

FIG. 33 depicts how a desktop computer can be used to interface with a lighting control network. In this embodiment, the central control unit 421 can store settings defined by the computer device 420 through a graphical user interface where a user modifies settings affecting brightness, color, and time of lighting characteristics produced by lighting fixtures 424 in the network using human input devices such as a keyboard 423 and mouse 422. In this embodiment, the computer is necessary only to apply settings to the control unit 421, and in another such embodiment, the computer 420 directly controls the lighting elements 424 using the control unit 421 as a network translator.

FIG. 34 describes three user control panels in the graphical user interface. Users modify parameters in the interface using a human interface device such as a mouse or keyboard. Display screen 450 depicts how the spatial position of a lighting fixture 449 may be defined in relation to a room floor plan 451 and a window 452. Display screen 453 depicts a method by which the user can make a selection of lighting fixtures by drawing an enclosed shape 454 on the floor plan 455. Panel 456 describes the interface using sliders 457 and zones 458 used to modify color and brightness schedules.

Figure 35:
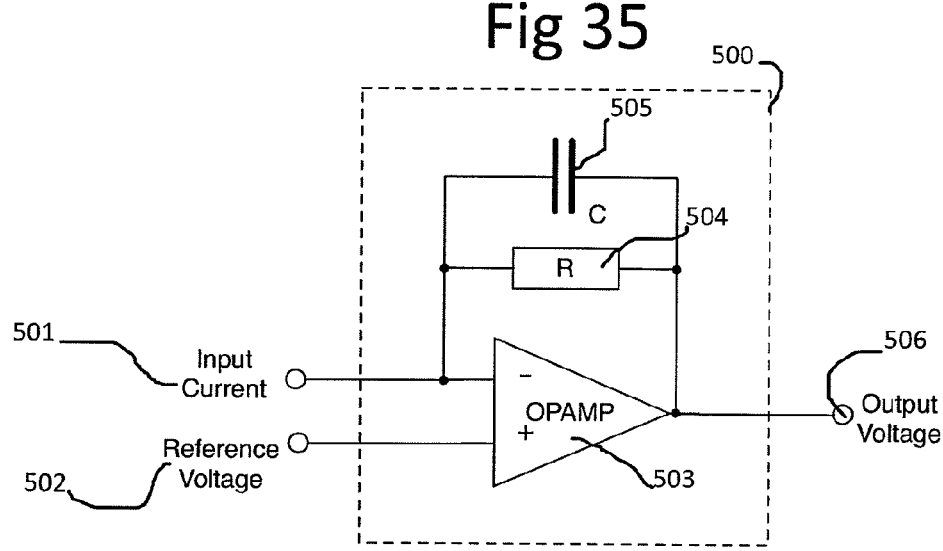
FIG. 35 depicts a transimpedance amplifier circuit which is used to convert current values from the light sensors into voltages.

FIG. 35 depicts how the present invention controls the sensor gain setting. In particular, FIG. 35 depicts a single transimpedance amplifier circuit unit 500 which is used to convert the current output of a photodiode sensor 501 into a voltage 506 suitable for interfacing to a controller. This transimpedance amplifier circuit operates using a constant reference voltage 502, an OP Amp 503, a resistor 504 (e.g., a potentiometer, MTI04C transimpedance amplifier that uses an internal variable resistor, etc.), and a capacitor 505. The 504 resistance determines the input current 501 sensitivity and may be held constant or can be changed to accommodate a wide dynamic range of input current 501. The capacitor 505 is selected to properly compensate the input capacitance of the photosensor. The resistor 504 may be internal to the amplifier component 500, in which case its value is fixed; it may consist multiple internal resistors to the component which are activated by pins on the device, or this resister may be located external to the amplifier 500, in which case it may be variable.

Figure 36:
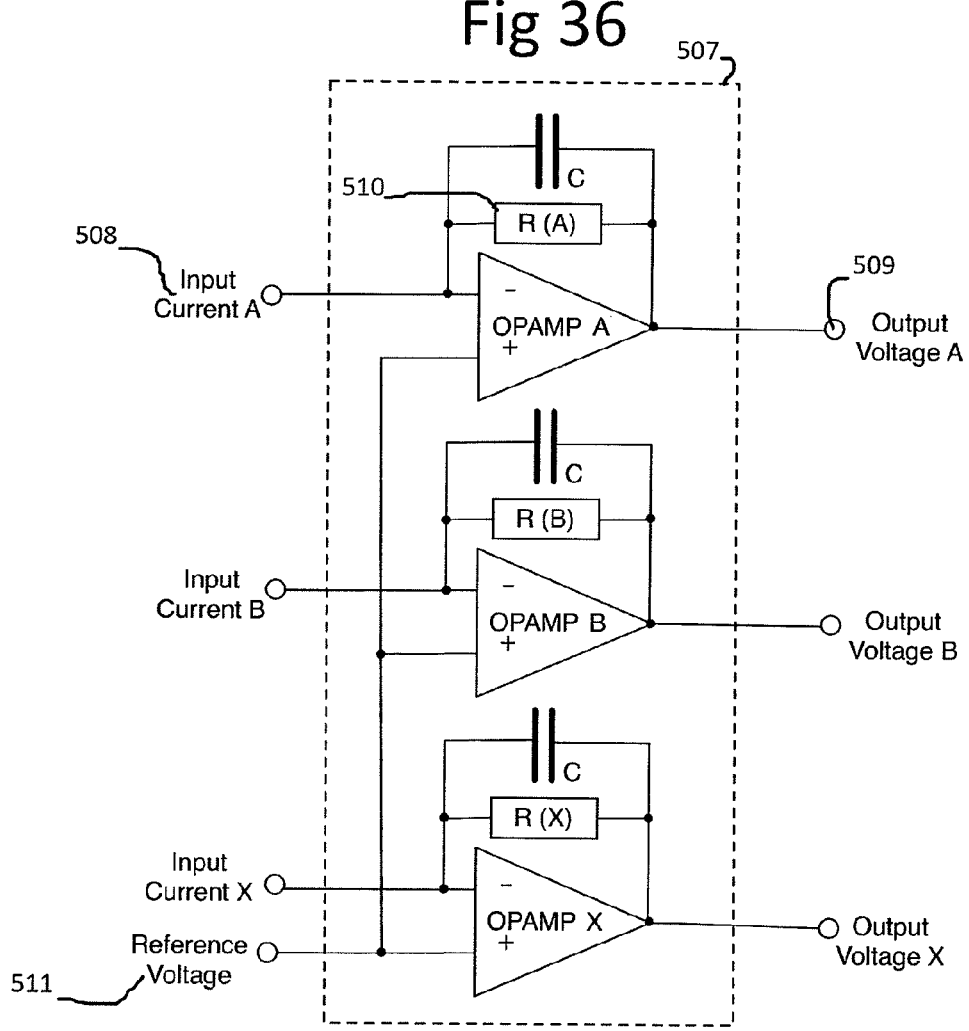
FIG. 36 depicts a transimpedance amplifier circuit which can convert multiple sensor input currents into voltages.

FIG. 36 depicts a similar transimpedance amplifier to FIG. 35 but comprises multiple input currents 508 and multiple output voltages 509. This multi channel transimpedance amplifier 507 operates similarly to the amplifier described in FIG. 35, employing multiple OP amps and resistors 510 with one singular reference voltage 511.

Figure 37:
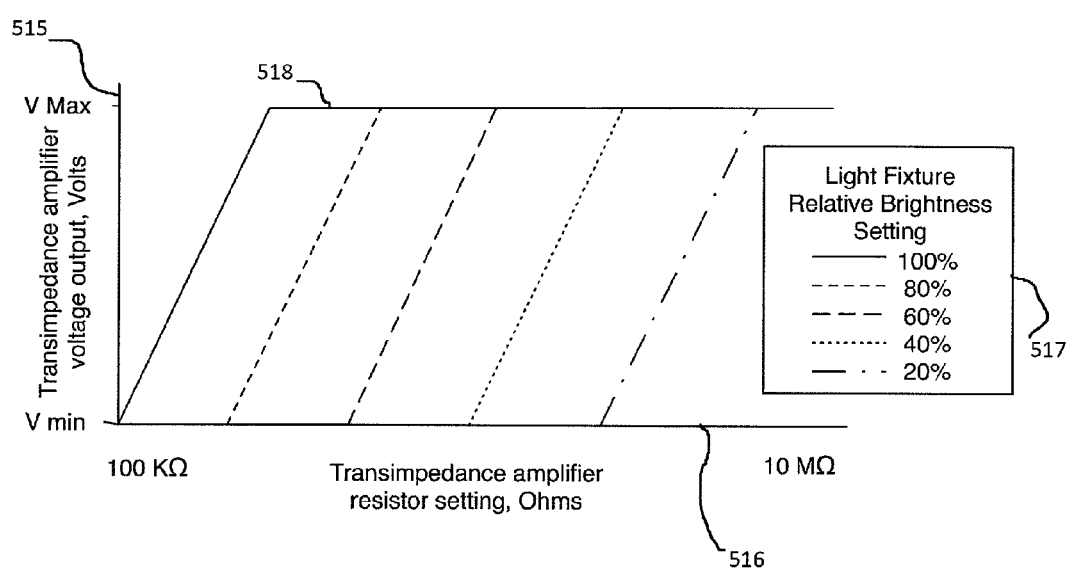
FIG. 37 is a chart relating the effective range the transimpedance amplifier is effective for a given resistor setting.

Since the light fixture's brightness level is variable, the light falling on the sensor may not be within the transimpedance amplifier's current threshold. This is why it is useful to change the resistor 504 resistance value to properly suit the sensing range of the fixture. FIG. 37 relates the light fixture's intensity given by series 517 ranging in 20%-100% relative brightness to the required resistance 516 in the transimpedance amplifier circuit necessary to resolve a voltage 515 to properly acquire optical feedback. For example, at 100% relative brightness, a given lighting channel's luminance may activate a given sensor, providing a current from the photodiode on the order of 1-10 µA. In order for the transimpedance amplifier to resolve this range of current, the resistance of resistor 504 must be on the order of 100KΩ. In another case, the lighting fixture is dimmed to 20%, providing only 0.1 µA of current for the transimpedance amplifier 500. If resistor 504 is fixed at 100KΩ, the voltage output 506 of the amplifier will be at a constant minimum 516, providing no useful data for feedback. In this case, it is necessary to change the resistance of resistor 504 to ~5 MΩ to achieve sensitivity in the 0.1-0.05 µA current range.

By way of example only, one application of the system/method of the present invention is the generation of an enriched light at 460 nm at an irradiance of 30 µW/cm$^2$ for use in treating clinical jaundice in newborns. Approximately 60% of all newborns become clinically-jaundiced sometime during the first week of life and phototherapy is indicated to help the neonatal liver clear bilirubin from their blood, as recommended by the Academy of Pediatrics.

Another exemplary application of the system/method of the present invention is the generation of an enriched light of 290 nm-315 nm to aid in Vitamin D production. This is an issue especially in the winter months as many people do not go outdoors and receive adequate sunlight exposure. This is also becoming an issue in the summer months too, as many elderly are staying out of the sun and closing their shades to save on energy costs. Seasonal Affective Disorder is usually treated with a light therapy of as much as 10,000 lux at 30 inches from the body for at least 30 minutes per day. In contrast, the light box therapy used currently is more focused on total lux versus the quality of the light to match a full sunlight spectrum.

Figure 38:
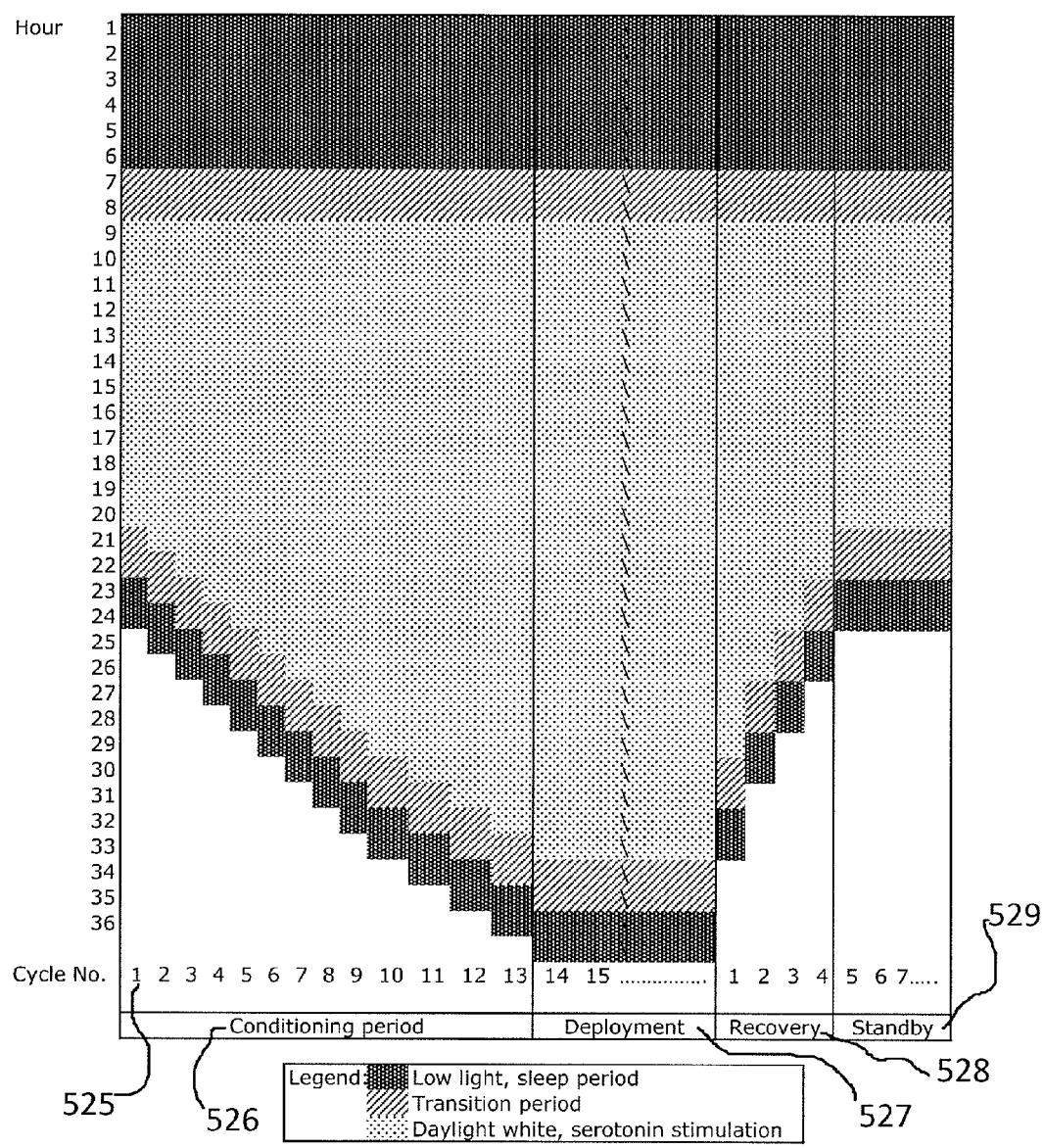
FIG. 38 is a chart depicting how the system/method of the present invention may be used to acclimate a subject to a 36-hour day, rather than a 24-hour day.

Thus, it should be understood that another exemplary application of the system/method of the present invention is Circadian Rhythm manipulation. For example, the present invention can implement Circadian Rhythm manipulation for the following individuals or scenarios:
  military application of training soldiers for 36-hour days;
  weaponization (intentional disorientation of enemy combatants' biorhythms);
  astronauts (for off-Earth environments or unintended return-to-Earth environments); this would include Lunar or Mars missions, or employing the system/ method at 1000 atmospheres below the ocean surface; the color temperature may be strange to compensate for deep space/Mars/ocean attenuation/or generally odd locally available light;

other military or aerospace applications which utilize different color spaces, e.g., conditioning Mars astronauts and training to work in constant 1800K Mars atmosphere light while maintaining Circadian Rhythm balance, or conditioning soldiers for 36 hour day deployments and back to 24 hour off-duty cycles. By way of example only, FIG. 38 depicts an exemplary schedule where the system/method of the present invention is utilized in a Circadian Rhythm manipulation. In particular, FIG. 38 describes another embodiment, in which the lighting system is used to adjust a subject to a 36-hour day, rather than a 24-hour day. In this embodiment, cycles of variable time periods are inputted end to end into the lighting system, beginning with a 24 hour, 525 daily schedule. The 24 hour cycles are followed by multiple 526 conditioning cycles, ranging between 24 and 36 hours, comprising the conditioning period 526. After the subjects have been appropriately conditioned to a 36 hour day, the deployment period 527 begins, which consists a user-defined length in number of cycles. In order to acclimate a subject back to a natural 24 hour 529 daily schedule, a recovery period 529 is defined by the user.

It should be noted that the lighting elements discussed above may comprise chip-type light emitting diodes (LEDs), packaged LED emitters, arrays of chip type LED emitters incorporated into a single package, or collections of packaged LED emitters attached to a common board or light engine. These LED emitters may be coated with materials intended to convert high frequency light into low frequency broad spectrum light, such as YAG:Ce phosphors, phosphor coatings, phosphor films, or lenses containing phosphor dispersions. Additionally, quantum dot photonic crystals, photonic nanocrystals, or semiconducting nanoparticles may be incorporated into lighting elements by means of coating, film, or filled lens material to convert high frequency light into lower frequency light. By extension, lighting elements may incorporate a blend of lumiphors or conversion materials, where each component converts light to a unique lower frequency color. More than one lumiphor may be incorporated into lighting devices where lumiphors are applied in sequence to different regions of the light emitting component, analogous to sub pixels on a video display. Lighting elements may also comprise devices employing organic semiconducting materials, such as organic light emitting diodes (OLEDS), or phosphorescent materials which emit either white or narrow band light in specific regions in the spectrum.

It should be further noted that intensity of channels or groups of lighting elements may be changed by pulse width modulation, current modulation, or other means of duty cycle modulation.

The sensors identified in FIGS. 16-24 may comprise charge coupled devices (CCD), ceramic metal oxide sensors (CMOS), phototransistors, or photodiodes. Each sensor may be an assembly or collection of multiple such devices employing visible filters or neutral density filters at the optical aperture of the sensors. Additionally, this sensor may be a chip type device incorporating multiple such sensors and color filters in a single package. Arrays packaged in this manner are often referred to as "color sensors" and may incorporate a means of changing gain settings to modify the luminous flux-output characteristics of the device via pin jumper settings. Sensors, sensor arrays, or sensor assemblies communicate with the controller via an analog or digital interface. The sensor or sensors may employ a transimpedance circuit to convert discreet current outputs to voltages and an integrated analog to digital converter circuit to combine the outputs of multiple sensors on a single digital or serial interface. Example components include:

a. ADJD-S313-QR999 digital RGB 7 bit color sensor from Avago Technologies;

b. HDJD-S722-QR999 analog RGB color sensor from Avago Technologies;

c. Hamamatsu S10170 3—channel photodiode;

d. TAOS TCS230 Light to Frequency converter

It should be further noted that it is within the broadest scope of the present invention to include various types of optical sensors and optical sensor output formats. For example, the optical sensors of the present invention may include analog optical sensors that output voltages or digital sensors that output data and/or frequency. Thus, optical sensors that output chromaticity coordinates as opposed to voltage, frequency or other output formats (e.g., other data) are all within the broadest scope of the invention. This also includes various sensor processing mechanisms such as voltage/frequency/current signals that are representative of optical data that can be correlated with known optical data (e.g., via look-up tables or other correlation methods).

It should also be noted that although the preferred system and method of the present invention utilize feedback control, it is within the broadest scope of the present invention to include a light fixture system or light fixture method that uses no feedback control to artificially generate the daylight locus.

It should be further noted that it is within the broadest scope of the present invention to include the use of the more recent CIE 1960 chromaticity diagram, in addition to the CIE 1931 chromaticity diagram mentioned previously, with regard to the system/method operation of the present invention.

While the invention has been described in detail and with reference to specific examples thereof, it will be apparent to one skilled in the art that various changes and modifications can be made therein without departing from the spirit and scope thereof.

The various embodiments described above can be combined to provide further embodiments. U.S. Pat. No. 8,436,556, issued May 7, 2013 and U.S. Provisional Application No. 61/249,858, filed Oct. 8, 2009, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system to control a plurality of channels of lighting elements to generate artificial sunlight with spectral characteristics that resemble natural sunlight, the system comprising:

a controller communicatively coupled to receive input signals, to receive signals from a number of light sensors, and to control the plurality of channels of lighting elements, the controller operable to:

sequentially individually activate each of the channels of lighting elements, receive signals from the light sensors, the respective signals representative of detected light for each of the channels of lighting elements;

automatically create a calibrated setpoint for each of the channels of lighting elements based at least in part on the respective signals generated for the respective channel of lighting elements by the light sensors;

automatically create respective drive signals for each of the channels of lighting elements based at least in part on the calibrated setpoint for the respective channel of lighting element and based at least in part on the received input signals; and automatically provide the respective drive signals to the channels of lighting elements to automatically vary a brightness level and a color level of the respective channels of lighting elements to produce a composite light along at least a portion of a daylight locus.

2. The system of claim 1 wherein the input signals are representative of at least one user-selected input.

3. The system of claim 2 wherein the user-selected input indicates a current activity of the user, and the respective drive signals automatically vary the brightness level and the color level for the respective channels of lighting element to produce the composite light along at least a portion of the daylight locus that corresponds to the current activity of the user.

4. The system of claim 2 wherein the user-selected input indicates a desired sunlight scenario, the desired sunlight scenario which is one of cloudless, partially cloudy, overcast, foggy, rainy, and snowy, and the respective drive signals automatically vary the brightness level and the color level for the respective channels of lighting element to produce the composite light along at least a portion of the daylight locus that corresponds to the desired sunlight scenario.

5. The system of claim 2 wherein the user-selected input indicates a desired one of at least two different color-time profiles, each of the at least two different color-time profiles specify values for one or more of brightness and color temperature versus time, and the respective drive signals automatically vary the brightness level and the color level for the respective channels of lighting element to produce the composite light along at least a portion of the daylight locus that corresponds to the values specified by the desired one of the at least two different color-time profiles for a current time.

6. The system of claim 2 wherein the user-selected input indicates a geographic location, and the respective drive signals automatically vary the brightness level and the color level for the respective channels of lighting element to produce the composite light along at least a portion of the daylight locus that corresponds to lighting conditions that exist at the geographic location.

7. The system of claim 1 wherein the input signals are representative of at least one defined schedule.

8. The system of claim 1 wherein the plurality of channels of lighting elements comprise a plurality of arrays combined on a common digital bus, each of the plurality of arrays comprising at least three of the channels of lighting elements and at least two of the at least two light sensors grouped within a common spatial region, the controller which provides via the common digital bus respective drive signals to the at least three channels of lighting element channel of each of the plurality of arrays based at least in part on the respective signals representative of the composite light detected by the at least two light sensors of such array to form a plurality of closed feedback loops.

9. The system of claim 1 wherein the plurality of channels of lighting elements are selectively operable to generate broad spectrum white light.

10. The system of claim 1 wherein the controller controls a total flux of blue light from a relative level of 1% to 100% of a maximum blue light flux within white light produced by the lighting elements.

11. The system of claim 1 wherein the plurality of channels of lighting elements are selectively operable to generate broad spectrum white light of color temperatures higher than 3000K and lower than 5000k.

12. The system of claim 1 wherein the plurality of channels of lighting elements are selectively operable to generate broad spectrum white light of color temperatures higher than 1800K and lower than 6500K.

13. A system to control a plurality of channels of lighting elements to generate artificial sunlight with spectral characteristics that resemble natural sunlight, the system comprising:

a controller communicatively coupled to receive signals from a number of light sensors representative of at least one characteristic of a composite light emitted by the lighting elements, and communicatively coupled to control the channels of lighting elements, the controller operable to:

receive a user-selected input that specifies an adjustment for a time-color profile that specifies values of one or more of brightness and color temperature versus time;

activate the channels of the lighting elements to generate a composite light;

activate a color match algorithm to automatically create respective drive signals for the channels of lighting elements based at least in part on the time-color profile and the respective signals representative of the composite light received from the light sensors; and automatically provide the respective drive signals to the channels of lighting elements to automatically vary a brightness level and color level of respective ones of the channels of lighting elements to produce the composite light along at least a portion of a daylight locus that corresponds to values specified by the time-color profile for a current time.

14. The system of claim 13 wherein the controller is operable further to:

cause a presentation of a user interface to receive the user-selected input that specifies the adjustment for the time-color profile.

15. The system of claim 13 wherein the controller causes a presentation of a user interface that represents time on a first axis, available values for one or more of brightness and color temperature on a second axis that is orthogonal to the first axis, and a plot of the values for one or more of brightness and color temperature versus time.

16. The system of claim 13 wherein the respective drive signals are based at least in part on the user-selected input and automatically vary the brightness level and the color level for respective channels of lighting elements to produce the composite light along at least a portion of the daylight locus that corresponds to the user-selected input.

17. The system of claim 16 wherein the user-selected input indicates a current activity of the user, and the respective drive signals automatically vary the brightness level and the color level for respective channels of lighting elements to produce the composite light along at least a portion of the daylight locus that corresponds to the current activity of the user.

18. The system of claim 16 wherein the user-selected input indicates a desired sunlight scenario, the desired sunlight scenario which is one of cloudless, partially cloudy, overcast, foggy, rainy, and snowy, and the respective drive signals automatically vary the brightness level and the color level for respective channels of lighting elements to produce the composite light along at least a portion of the daylight locus that corresponds to the desired sunlight scenario.

19. The system of claim 16 wherein the user-selected input indicates a desired one of at least two different color-time profiles, each of the at least two different color-time profiles specify values for one or more of brightness and color temperature versus time, and the respective drive signals automatically vary the brightness level and the color level for respective channels of lighting elements to produce the composite light along at least a portion of the daylight locus that corresponds to the values specified by the desired one of the at least two different color-time profiles for a current time.

20. The system of claim 16 wherein the user-selected input indicates a geographic location, and the respective drive signals automatically vary the brightness level and the color level for respective channels of lighting elements to produce the composite light along at least a portion of the daylight locus that corresponds to lighting conditions that exist at the geographic location.

21. The system of claim 13 wherein the plurality of lighting element channels comprise a plurality of arrays combined on a common digital bus, each of the plurality of arrays comprising at least three of the plurality of lighting element channels and at least two of the light sensors grouped within a common spatial region, the controller which provides via the common digital bus respective drive signals to the at least three channels of lighting elements of each of the plurality of arrays based at least in part on the respective signals representative of the composite light detected by the light sensors of such array to form a plurality of closed feedback loops.

22. The system of claim 13 wherein the channels of lighting elements are selectively operable to generate broad spectrum white light.

23. The system of claim 13 wherein the channels of lighting elements are selectively operable to generate broad spectrum white light of color temperatures between at or greater than 3000K and at or less than 5000K.

24. The system of claim 23 wherein the controller controls a total flux of blue light from a relative level of 1% to 100% of a maximum blue light flux within the broad spectrum white light produced by the lighting elements.

* * * * *